United States Patent
Jahn et al.

(10) Patent No.: US 10,544,053 B2
(45) Date of Patent: Jan. 28, 2020

(54) SYSTEMS FOR PETROLEUM WASTEWATER TREATMENT INCLUDING REMOVABLE COALESCER COMPONENTS AND RELATED METHODS

(71) Applicant: Purestream Services, LLC, Salt Lake City, UT (US)

(72) Inventors: Christopher Jahn, Mission Viejo, CA (US); Christopher Sochalski, Cottonwood Heights, UT (US); Billy Cruz, Salt Lake City, UT (US)

(73) Assignee: Purestream Services, LLC, Salt Lake City, UT (US)

( * ) Notice: Subject to any disclaimer, the term of this patent is extended or adjusted under 35 U.S.C. 154(b) by 933 days.

(21) Appl. No.: 15/068,307

(22) Filed: Mar. 11, 2016

(65) Prior Publication Data
US 2017/0260071 A1  Sep. 14, 2017

(51) Int. Cl.
*C02F 1/24* (2006.01)
*C02F 1/52* (2006.01)
(Continued)

(52) U.S. Cl.
CPC ............ *C02F 1/52* (2013.01); *B01D 21/0069* (2013.01); *C02F 1/20* (2013.01); *C02F 1/24* (2013.01);
(Continued)

(58) Field of Classification Search
CPC ...... C02F 1/24; C02F 1/52; C02F 1/20; C02F 1/66; C02F 2101/32; C02F 2101/322; C02F 2103/10; B01D 21/0069
(Continued)

(56) References Cited

U.S. PATENT DOCUMENTS 3,948,768 A * 4/1976 Chapman ............. B01D 17/045
516/136
4,541,967 A   9/1985 Masaki
(Continued)

FOREIGN PATENT DOCUMENTS

GB           259751      10/1926
WO    WO2011072252     6/2011

OTHER PUBLICATIONS

Hein, Andy "Coalescing Plate Packs" Dec. 16, 2007, 4 pages; Accessed Feb. 10, 2016 at http://www.hydro-carbon.nl/hydro-carbon-separation/coalescing-plat-packs/.
(Continued)

*Primary Examiner* — Thomas M Lithgow
(74) *Attorney, Agent, or Firm* — Thorpe North & Western LLP

(57) ABSTRACT

Apparatus for removing suspended impurities from a liquid (e.g., wastewater), methods of use, and systems including such apparatus. In an embodiment, an apparatus may include a vessel defining a chamber for receiving gas induced liquid influent through an inlet, the influent including suspended impurities. A riser tube may be provided within the vessel, in fluid communication with the inlet so that liquid influent introduced into the vessel through the inlet is introduced into the riser tube. One or more coalescing members may be disposed within the riser tube. The coalescing members may be sufficiently small to be easily removable by hand, without requiring a crane. The coalescing members may be freely disposed within the riser tube, rotatable within the flow of the liquid influent, aiding the coalescing members in exhibiting some degree of "self-cleaning", so as to be less prone to fouling and clogging.

16 Claims, 14 Drawing Sheets

(51) Int. Cl.
    *B01D 21/00*     (2006.01)
    *C02F 1/20*      (2006.01)
    *C02F 1/66*      (2006.01)
    *C02F 101/32*    (2006.01)
    *C02F 103/10*    (2006.01)

(52) U.S. Cl.
    CPC ............ *C02F 1/66* (2013.01); *C02F 2101/32* (2013.01); *C02F 2101/322* (2013.01); *C02F 2103/10* (2013.01)

(58) Field of Classification Search
    USPC ...................................................... 210/221.2
    See application file for complete search history.

(56)                 References Cited

U.S. PATENT DOCUMENTS

| | | |
|---|---|---|
| 4,564,457 A | 1/1986 | Cairo, Jr. et al. |
| 5,080,802 A | 1/1992 | Cairo, Jr. et al. |
| 6,371,452 B1 | 4/2002 | Shojaie |
| 8,425,668 B2 | 4/2013 | Lakatos et al. |
| 8,460,509 B2 | 6/2013 | Lakatos et al. |
| 2004/0041284 A1 | 3/2004 | Lau |
| 2005/0098908 A1 | 5/2005 | Honnell |
| 2011/0139378 A1 | 6/2011 | Lakatos et al. |

OTHER PUBLICATIONS

Barrande, M., et al. "Tortuosity of Porous Particles," Analytical Chemistry, 2007, vol. 79, 8 pages.
International Search Report for PCT/US2016/026458 dated Jul. 12, 2016, 9 pages.

\* cited by examiner

SYSTEMS FOR PETROLEUM WASTEWATER TREATMENT INCLUDING REMOVABLE COALESCER COMPONENTS AND RELATED METHODS

CROSS-REFERENCE TO RELATED APPLICATIONS

Not applicable.

BACKGROUND OF THE INVENTION

1. The Field of the Invention

The present invention relates to wastewater treatment systems and methods that are useful in treating wastewater, e.g., as derived or employed in oil and/or gas exploration, drilling, and production.

2. The Relevant Technology

As natural gas is extracted from a ground well, a significant quantity of water often accompanies the natural gas. This water is typically separated from the natural gas at a location proximate to the well head and then stored in an adjacent tank. Because of contaminants within the water, the water is typically trucked to a licensed disposal facility where it is deposited in a lined pond for evaporation. This same operation also typically occurs in the context of oil wells. That is, a significant quantity of water will often accompany extracted oil. Such water may also often be present where hydraulic fracturing (i.e., "fracking") is employed. Expenses associated with trucking or otherwise transporting such contaminated wastewater to a licensed disposal facility can be significant.

Thus, it is advantageous to be able to treat wastewater onsite; U.S. Pat. No. 5,080,802 to Cairo Jr. et al. describes methods and apparatus for removing suspended matter from liquid wastewater streams. Cairo Jr. et al. describes induced gas flotation separator systems that include a coalescer riser tube and a coalescer riser pack positioned to ensure coalescence of influent contaminants, facilitating separation of such contaminants from the water within the wastewater stream. While such systems and methods as described in Cairo Jr. et al. can be generally effective, there exists a continuing need for improved systems and methods.

BRIEF SUMMARY

Various embodiments of the present disclosure relate to apparatus for removing suspended impurities from a liquid, methods of use, and systems including such apparatus. In an embodiment, an apparatus (e.g., an induced gas floatation tank) may include a vessel defining a chamber for receiving gas induced liquid influent through an inlet, the influent including suspended impurities. A riser tube may be provided within the vessel, in fluid communication with the inlet so that liquid influent introduced into the vessel through the inlet is introduced into the riser tube. One or more coalescing members may be disposed within the riser tube. In an embodiment, the coalescing members are rotatable within the flow through the riser tube as liquid influent flows over and through the coalescing members. By allowing the coalescing members to move (e.g., rotate) within the flow within the riser tube, they may exhibit some "self-cleaning" characteristics, so as to be less prone to fouling and clogging, which is a continuing problem within induced gas floatation tanks. For example, the coalescing members may be configured as generally spherical members (e.g., TELL-ERETTES), cylindrical, ovoid, or other rounded structures that may rotate within the flow. The direction of influent flow within the riser tube may be generally vertical, with influent entering at the bottom of the riser tube, and flowing upwards.

In an embodiment, such rotatable coalescing members may be mounted on one or more axles within the riser tube, allowing the coalescing members (e.g., spheres mounted on axles) to rotate about the axle(s) as the liquid flows through the coalescing section of the riser tube. Layers of such axle mounted coalescing members may be provided within the coalescing section, with the axles provided at different angles (offset) from one layer to the next, to pack the coalescing members within the riser tube in a non-random, ordered arrangement, while minimizing or eliminating the presence of any bypass channels through the coalescer section, by which the liquid influent might otherwise avoid contact with the coalescing members. Such a configuration further allows the coalescing members to rotate about the axles, providing the self-cleaning function described above.

In an embodiment, the apparatus includes a plurality of coalescing members that are freely packed or positioned within the riser tube in a manner so that individual coalescing members are easily removable from the riser tube to allow for their replacement when the coalescing members become fouled over time as the liquid influent flows over the coalescing members. For example, existing coalescing structures within such induced gas floatation tanks are not readily and easily removable, particularly once the coalescer structure becomes fouled. For example, where the coalescer is instead comprised of a plurality of relatively small coalescing members (e.g., generally spherical members), removal of the coalescing members is much easier, and can be done with minimal downtime to the apparatus and system. In addition, the plurality of such individual coalescing members may be far less expensive than existing coalescer structures, where replacement represents a significant capital expense.

In another embodiment, a plurality of coalescing members may be disposed within the riser tube, where individual coalescing members are segments of an overall larger combined assembly of individual coalescing member segments. For example, the segments may be placed next to one another, (e.g., in an underlying tray, or the like) to form a combined assembly of coalescing member segments in the riser tube over or through which the liquid influent flows. Such segmentation may be helpful when removal of a fouled coalescing section is needed. For example, rather than requiring removal of the entire coalescing section as a single piece (which typically requires a crane), individual coalescing member segments may simply be pulled or otherwise removed from the assembly, and removed from the vessel, e.g., by hand. Such a configuration thus facilitates easier removal of a fouled coalescer assembly, where such removal and replacement (or cleaning and reinsertion) is needed. Because the contemplated coalescing members can be sourced at relatively little expense, they may simply be discarded upon removal, rather than cleaned and reinserted. Of course, cleaning and reinsertion is also possible.

The present disclosure also relates to methods for removing suspended impurities from a liquid (e.g., a gas induced liquid stream such as that fed to an induced gas floatation tank). Such a method may include providing an apparatus, such as any of those described herein, including one or more removable coalescing members disposed within the riser tube, and introducing the liquid influent through the inlet into the riser tube where it contacts the coalescing members. Periodically (e.g., whether at regular intervals, or irregularly), the coalescing members may be removed from the riser tube, and replaced with unfouled coalescing members. For example, they may be replaced with new coalescing members, or cleaned coalescing members (e.g., recycled for use again after having been cleaned).

These and other advantages and features of the present invention will become more fully apparent from the following description and appended claims, or may be learned by the practice of the invention as set forth hereinafter.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

I. Introduction

Figure 1:
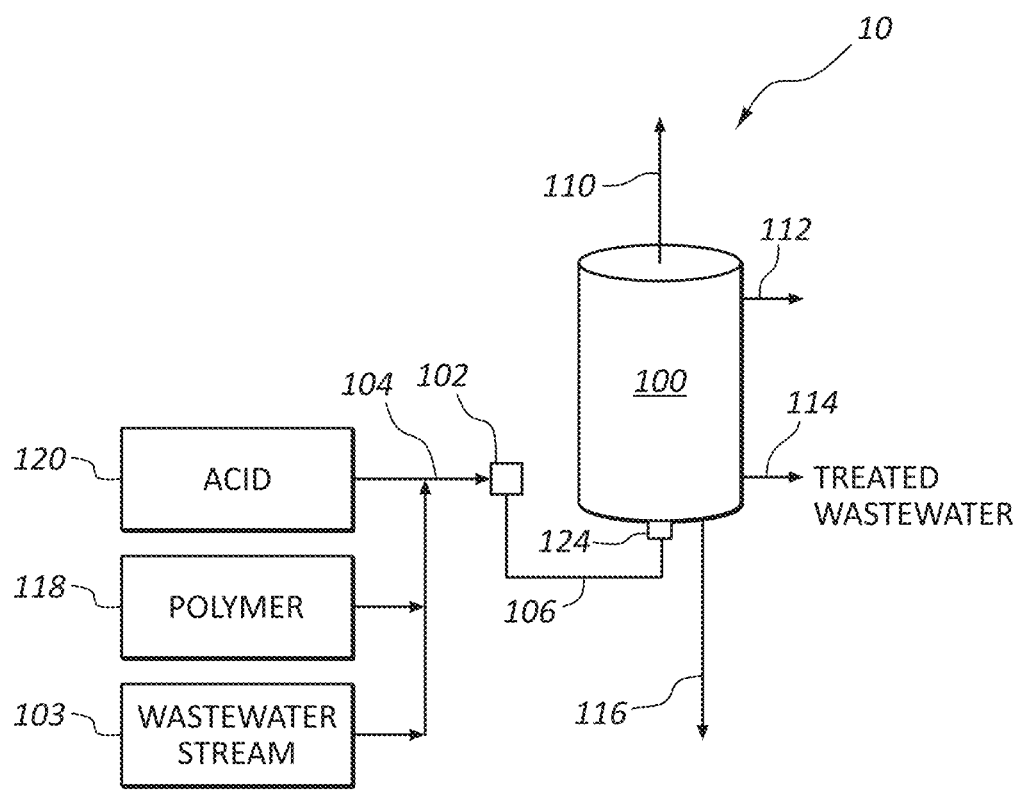
FIG. 1 schematically illustrates an exemplary system that may include an apparatus, such as an induced gas floatation tank, for removing suspended impurities from a feed stream.

Before describing various embodiments of the present disclosure in detail, it is to be understood that this disclosure is not limited to the parameters of the particularly exemplified systems, methods, and/or products, which may, of course, vary. Thus, while certain embodiments of the present disclosure will be described in detail, with reference to specific configurations, parameters, features (e.g., components, members, elements, parts, and/or portions), etc., the descriptions are illustrative and are not to be construed as limiting the scope of the claimed invention. In addition, the terminology used herein is for the purpose of describing the embodiments, and is not necessarily intended to limit the scope of the claimed invention.

Unless defined otherwise, all technical and scientific terms used herein have the same meaning as commonly understood by one of ordinary skill in the art to which the present disclosure pertains.

Various aspects of the present disclosure, including systems, processes, and/or products may be illustrated with reference to one or more embodiments or implementations, which are exemplary in nature. As used herein, the terms "embodiment" and implementation" mean "serving as an example, instance, or illustration," and should not necessarily be construed as preferred or advantageous over other aspects disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

It will be noted that, as used in this specification and the appended claims, the singular forms "a," "an" and "the" include plural referents unless the context clearly dictates otherwise. Thus, for example, reference to a "bristle" includes one, two, or more bristles. Similarly, reference to a plurality of referents should be interpreted as comprising a single referent and/or a plurality of referents unless the content and/or context clearly dictate otherwise. Thus, reference to "bristles" does not necessarily require a plurality of such bristles. Instead, it will be appreciated that independent of conjugation; one or more bristles are contemplated herein.

As used herein, directional terms, such as "top," "bottom," "left," "right," "up," "down," "upper," "lower," "proximal," "distal" and the like are used herein solely to indicate relative directions and are not otherwise intended to limit the scope of the disclosure and/or claimed invention.

Various aspects of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated. Furthermore, binding, coupling, attaching, connecting, and/or joining can comprise mechanical and/or chemical association.

To facilitate understanding, like reference numerals (i.e., like numbering of components and/or elements) have been used, where possible, to designate like elements common to the figures. Specifically, in the exemplary embodiments illustrated in the figures, like structures, or structures with like functions, will be provided with similar reference designations, where possible. Specific language will be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential). Furthermore, multiple instances of an element and or sub-elements of a parent element may each include separate letters appended to the element number. Furthermore, an element label with an appended letter can be used to designate an alternative design, structure, function, implementation, and/or embodiment of an element or feature without an appended letter. Likewise, an element label with an appended letter can be used to indicate a sub-element of a parent element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where multiple possibilities of values or a range a values (e.g., less than, greater than, at least, or up to a certain value, or between two recited values) is disclosed or recited, any specific value or range of values falling within the disclosed range of values is likewise disclosed and contemplated herein.

Numbers, percentages, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, the terms "substantially", "similarly", "about", "approximately", and similar terms as used herein represent an amount or state close to the stated amount or state that still performs a desired function or achieves a desired result. For example, the term "substantially" "about" or "approximately" may refer to an amount that is within 10% of, within 5% of, or within 1% of, a stated amount or value.

The headings used herein are for organizational purposes only and are not meant to be used to limit the scope of the description or the claims.

Embodiments of the present invention are directed to apparatus, systems, and methods for removing suspended impurities from a liquid. For example, an induced gas floatation (IGF) system may be used to clean water or another liquid, often produced as a by-product of an oil and/or gas production process, or from another industrial process. By way of example, in order to separate the contaminants from the water or other liquid, the contaminated liquid may have a small amount of polymer added thereto, and air or another gas may be inducted therein, shortly prior to introduction into a coalescing tank. The polymer aids in allowing the contaminants to coalesce together, while induction of the gas results in formation of very small gas bubbles (e.g., average size of about 100 microns or less) within the feed stream introduced into the coalescing tank. Because the gas bubbles are very small, the induced gas has a very large surface area within the liquid feed stream. During operation, the polymer assists in adhering and coalescing the impurities on the gas bubbles. In turn, the gas bubbles lift the coalesced impurities to the top of the tank where they are collected and removed.

Such systems are described in U.S. Pat. Nos. 5,080,802 and 8,425,668, each of which is herein incorporated by reference in its entirety. Within such systems, the gas induced stream is introduced into a riser tube, which includes a coalescer riser pack, where coalescence of the impurities within the feed stream occurs. In addition to the typical polymer additive(s), one or more other additives (e.g., an acid, or other adjuvant) may additionally or alternatively be added to the feed stream to aid in adherence and coalescence of the impurities, allowing them to be separated from the remainder of the feed stream.

One recurring problem with such existing systems has been that the coalescer riser pack within the riser tube tends to become fouled, and eventually clogs by the coalesced impurities. Conventional coalescer riser packs comprise a plurality of plates or baffles that are secured together to form a fixed integral structure that has a plurality of convoluted flow paths extending therethrough. Existing coalescer riser packs are inserted into and removed from the coalescing tank as a unitary structure with no movable parts. Clogging of the coalescer riser pack can result in poor separation of the impurities from the water (or other liquid), plugging or slowing of the flow through the riser pack, and other performance issues. In order to address such a clogged coalescer riser pack, the system must typically be shut down, the tank or other vessel opened up, and the coalescer riser pack removed from the tank. Such a procedure typically requires a crane to lift the clogged coalescer riser pack structure from the tank. Such removal is an arduous and dangerous task, as often the coalescer riser pack is formed of steel or other metal, with numerous sharp edges (e.g., resembling a slanted grid pattern including razor sharp edges). Removal and cleaning of such a coalescer riser pack can be an incredibly undesirable task. Because the typically employed coalescer riser pack is relatively expensive, it may be desirable to clean the coalescer riser pack (e.g., using high pressure hot water) to remove the fouling that accumulates on the coalescer riser pack, which is responsible for plugging the structure. Once cleaned, the coalescer riser pack may be lowered back into the tank again (e.g., by crane). Such shutdowns of the system associated with necessary cleaning and unclogging of the coalescer riser pack are also expensive in downtime, as the system is offline. If the fouled coalescer riser pack cannot be effectively cleaned, it must be replaced, which is an expensive proposition. For example, such a coalescer riser pack may cost tens of thousands of dollars.

According to aspects of the present invention, novel coalescing members can be used within the tank of the IGF system to replace the conventional coalescer riser packs and assist with coalescing of the impurities. The alternative coalescing members can be smaller and lighter than a conventional coalescer riser pack, thereby allowing them to be easily retrieved and removed from the tank if they become fouled. A plurality of such relatively small coalescing members may be positioned within the riser tube, rather than the unitary coalescer riser pack that is a single piece. Such single piece coalescer riser packs employed previously may become quite heavy and unwieldy, particularly when fouled and clogged. For example, it is not unusual for a fouled and/or clogged coalescer riser pack to weight 4 to 5 times its initial "clean" weight. Where such a fouled and/or clogged coalescer riser pack weighs several hundred pounds, a crane may be required for its removal, and because of all the sharp edges associated with a typical coalescer riser pack, removal and cleaning can be both dangerous and time-consuming as discussed above. The inventive coalescing members are also significantly less expensive than traditional coalescer riser packs. As a result, fouled coalescing members can simply be discarded and replaced with clean coalescing members, thereby minimizing down time of the system and eliminating the time and effort previously used for cleaning. Alternatively, they can be cleaned, and reused, if desired.

In an embodiment, the coalescing members may be provided in a manner so that they are rotatable within the flow of the feed stream passing through the riser tube. Such rotatability may decrease any tendency for the coalescing members to become fouled in the first place.

In an embodiment, the coalescing members can be freely packed or positioned within the riser tube in a manner so that they can be individually removed from the vessel where their removal and cleaning or replacement may be needed.

In an embodiment, the coalescing members may be segments of a combined assembly of coalescing member segments. For example, such segments may be positioned next to one another, in an underlying tray or the like, so as to allow assembly of an overall combined coalescer structure assembly, e.g., within the riser tube, and to allow individual coalescing member segments of such an assembly to be removed, without having to remove the entire coalescing structure at once. For example, relatively smaller segments could be removed piecemeal from the riser tube and vessel, which process may be significantly easier than applicable to existing systems where a crane is required to remove the entire coalescer riser pack at once. For example, the coalescing members may each have a longest dimension of not more than about 12 inches (30 cm), or from about 2 inches (5 cm) to about 6 inches (15 cm). In a similar manner, where a plurality of relatively small coalescing members are employed (e.g., even if not segments of a larger assembly), removal of all the coalescing members may be achieved much faster and easier (e.g., by hand, without the need for a crane) than is applicable with existing systems.

II. Exemplary Apparatus Including Coalescing Members

FIG. 1 schematically illustrates a simplified system that may include an IGF apparatus (e.g., a coalescing tank) as described herein. Such coalescing tanks are sometimes and often interchangeably referred to as IGF tanks, coalescer tanks, separation tanks, or upflow induced air (or gas) separators. For example, such a system 10 may include a coalescing tank 100 and a gas induction apparatus 102, which mixes gas into a liquid stream 104 to form an induction feed stream 106. The gas typically comprises air but other forms of gas can also be used. Stream 104 comprises a wastewater stream 103 and one or more additives (e.g., polymer 118, acid 120, and/or any other desired additives, and the like). The additives can be introduced into wastewater stream 103 either prior to or at induction apparatus 102. Wastewater stream 103 typically comprises water and oil. The oil is typically crude oil but other processed or partially processed oils could also be included. Wastewater stream 103 can also include particulate and other contaminates. As previously mentioned, wastewater stream 103 is typically a waste stream resulting from natural gas production or oil production from a well. However, wastewater stream 103 could also be produced from water that has been contaminated or otherwise mixed with oil such as during an oil spill or where oil has leaked into ground water. In other embodiments, wastewater stream 103 may be produced during oil refining or other production or processing procedures.

Examples of polymers 118 that can be used include high or low molecular weight anionic or cationic polymers that are water or emulsion soluble, such as polymamines, polyamides, and combinations thereof (e.g., polyacrylamide). Other polymers can also be used. Examples of acids 120 that can be used include strong mineral acids such as hydrochloric acid, sulfuric acid, and mixtures thereof. Other acids can also be used.

Feed stream 106 may be introduced into tank 100 through an inlet 124 (e.g., in or near a bottom of tank 100). Coalescing tank 100 may operate to separate feed stream 106 into a gas stream 110, a contaminate stream 112 and a treated liquid stream (e.g., treated wastewater) 114. Gas stream 110 and contaminate stream 112 typically exit at an upper end of tank 100 while treated liquid stream 114 typically exits at a lower end of tank 100. In some embodiments, solids, such as in the form of particulates, may settle within tank 100. Where such occurs, the tank 100 may be periodically washed out or the solids otherwise extracted so that a solids stream 116 is removed. Solids stream 116 is also typically removed at the lower end of tank 100.

Depending on the particular application, gas stream 110 may include volatile organic compound ("VOC") components which are recovered, flared, or otherwise directed. In some embodiments, at least a portion of gas stream 110 may be recycled back to gas induction apparatus 102, or otherwise directed, as desired. Where further purification of treated liquid stream 114 is desired, this stream could be fed into a second, downstream coalescer tank (not shown) after similar addition of desired additives, and gas induction, e.g., as described in conjunction with FIG. 13 of U.S. Pat. No. 8,425,668, already incorporated by reference in its entirety. Other downstream separation techniques could also be employed relative to stream 114, as desired.

Figure 2:
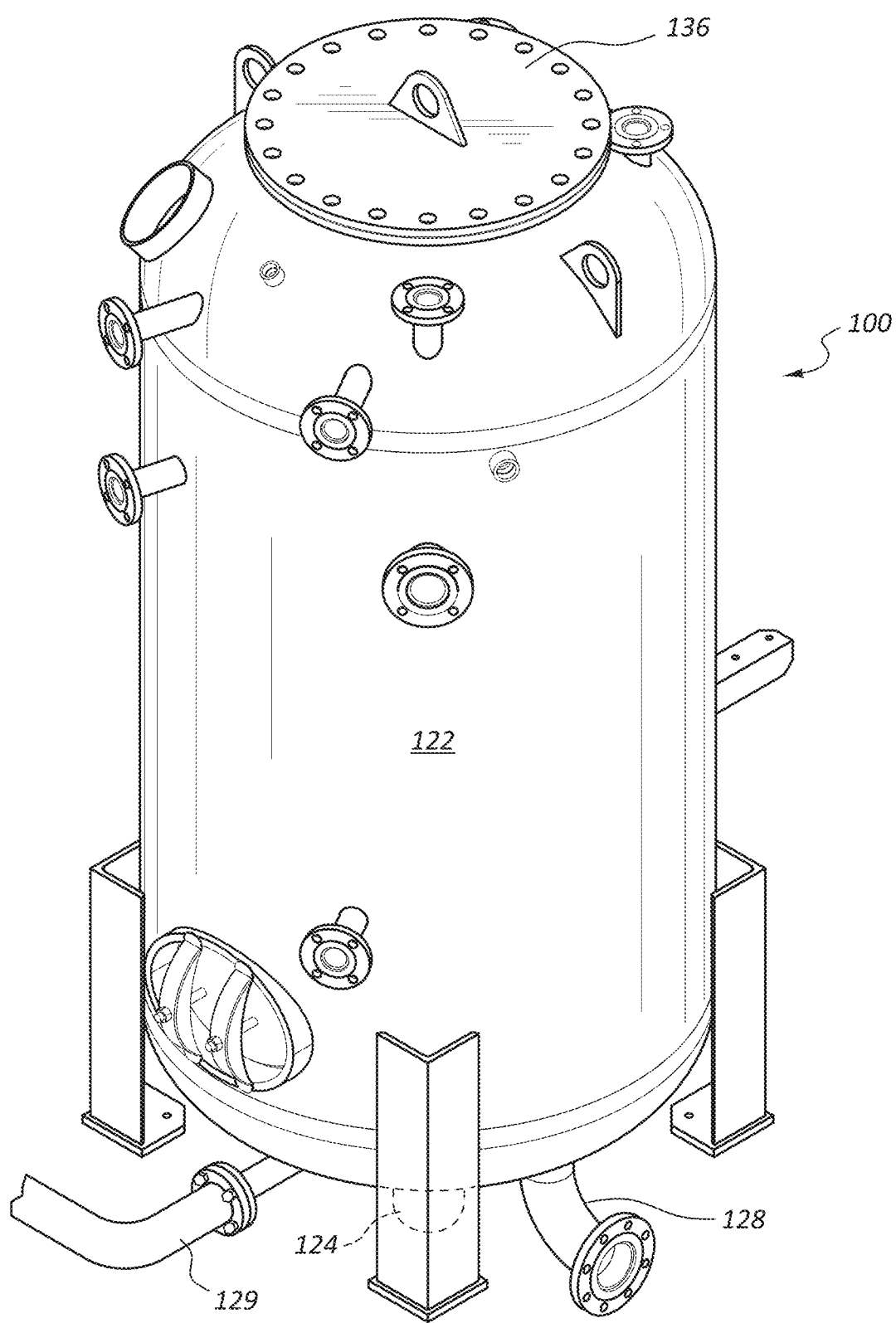
FIG. 2 is a perspective view of an exemplary apparatus for removing suspended impurities from a liquid feedstream.
Figure 3:
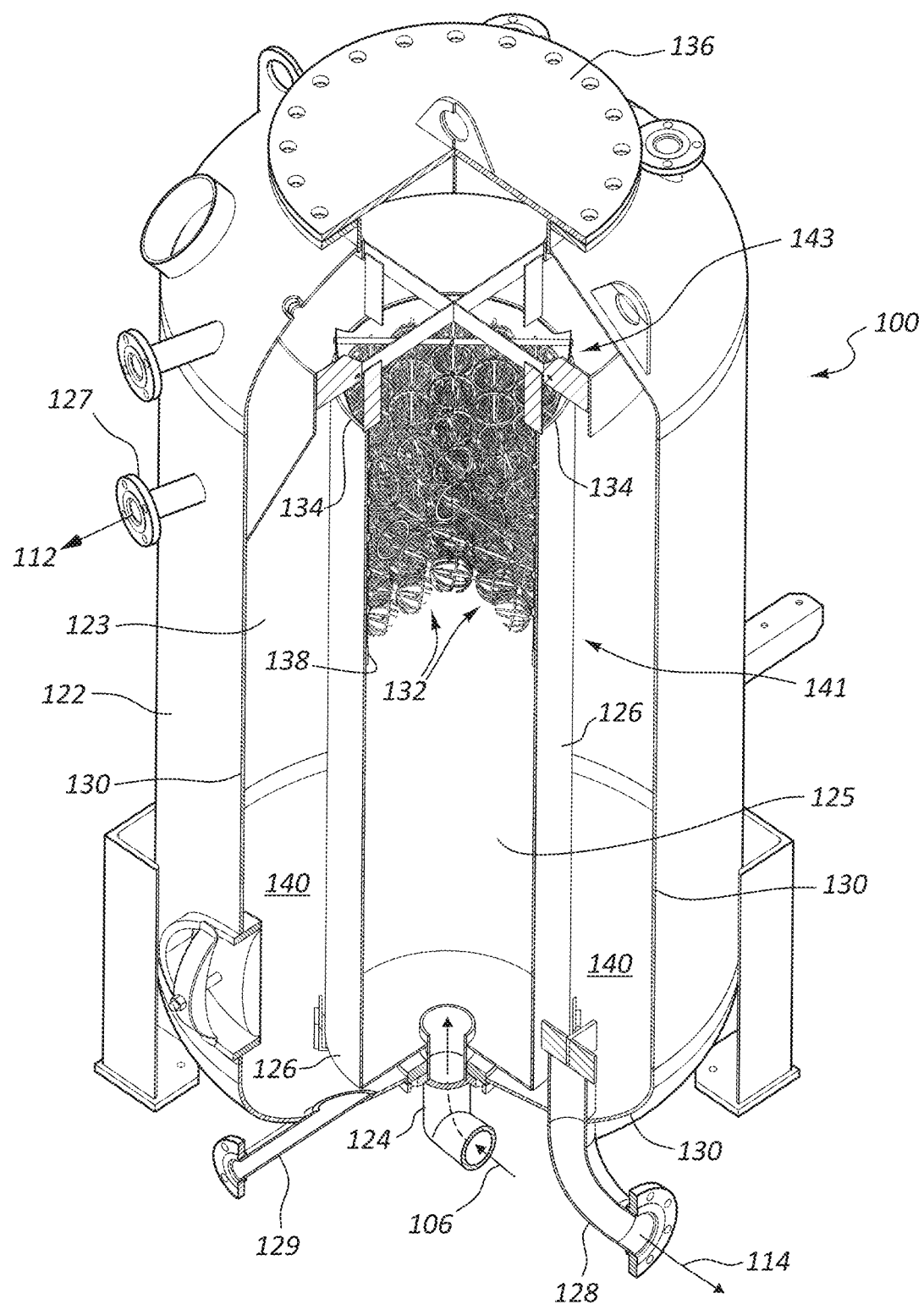
FIG. 3 is a cut-away view into the apparatus of FIG. 2, illustrating select internal components.
Figure 4:
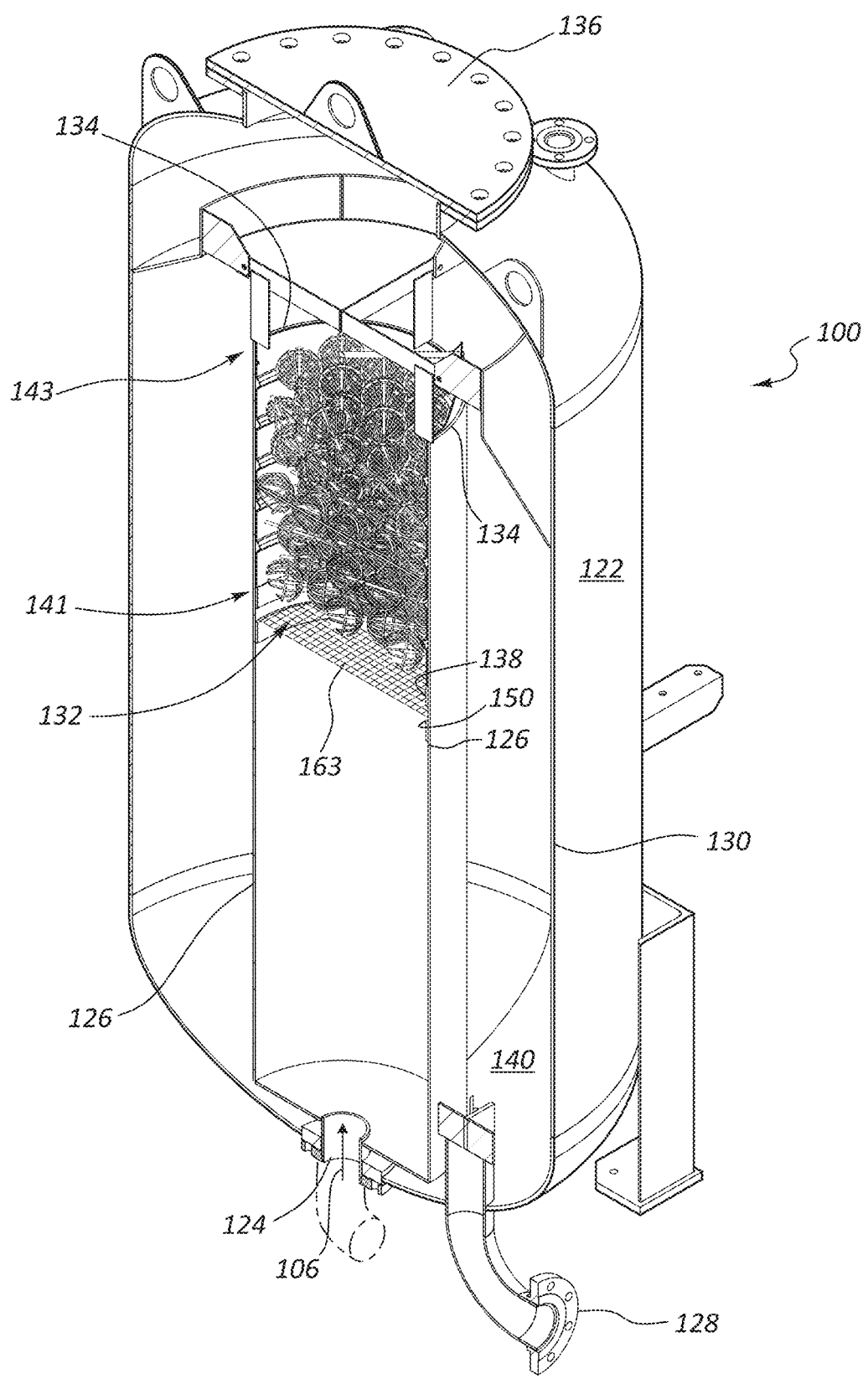
FIG. 4 is another cut-away view of the apparatus of FIG. 2.

FIGS. 2-4 illustrate more detailed perspective and cut-away views of exemplary coalescing tank 100 for removing suspended impurities, typically oils, i.e., hydrocarbons, and particulates, from an induction feed stream 106. Coalescing tank 100 may include a vessel (e.g., such as in the form of a tank) 122 defining an internal chamber 123 for receiving gas induced feed stream 106 through inlet 124, where induction feed stream 106 includes suspended impurities. Coalescing tank 100 may include a riser tube 126 that vertically extends within vessel 122 and terminates within vessel 122 at an annular top lip 134. Riser tube 126 is in fluid communication with inlet 124 (e.g., inlet 124 may be formed into the bottom of riser tube 126) so that feed stream 106 introduced into coalescing tank 100 through inlet 124 is introduced into riser tube 126 (e.g., the bottom of tube 126). Riser tube 126 at least partially divides internal chamber 123 of vessel 122 into an inner chamber 125, i.e., the area within tube 126, and an outer chamber 140, i.e., that area between riser tube 126 and vessel 122. Inner chamber 125 of riser tube 126 is filled with feed stream 106 until feed stream 106 eventually overflows top lip 134 of riser tube 126 and flows into outer chamber 140. The liquid overflowing top lip 134 and cascading down into outer chamber 140 includes both contaminate stream 112 (which includes the coalesced impurities and is typically in the state of a foam) and wastewater stream 114 which is the treated and at least partially purified portion of feed stream 106. Within outer chamber 140, contaminate stream 112 and wastewater stream 114 automatically separate with the lighter foamed contaminate stream 112 rising and wastewater stream 114 settling. As such, contaminate stream 112 can exit through an outlet 127 at an upper end of vessel 122 while treated wastewater stream 114 can exit through an outlet 128 at the lower end of vessel 122. An outlet 129 may be provided as a low point drain for outer chamber 140. The pipe of outlet 129 may be coped to follow the contour of the outer chamber so that solids can be drained as well. For example, outlet 129 may be used when the system is being drained for transport.

Within riser tube 126 are one or more coalescing members 132 that are used in purifying feed stream 106. In an embodiment, as shown, the coalescing members 132 may be disposed within a top portion of riser tube 126, e.g., adjacent the top lip 134, over which the liquid flows as it passes out of riser tube 126. In at least some embodiments, the coalescing members 132 may be configured so as to be easily removable from the riser tube 126, and from the vessel 122. For example, a plurality of relatively small sized coalescing members 132 may be provided, which individually are significantly smaller than any width or diameter dimension of the riser tube 126, as well as any opening (e.g., lid 136) providing an entrance into vessel 122. Such characteristics may facilitate much easier removal of the coalescing members 132 from the riser tube 126 as compared to existing configurations, where a crane is typically required for removal of a conventional coalescer riser pack, previously discussed, which has become clogged. In addition, where a conventional coalescer riser pack has clogged, it also typically has become "stuck" within the riser tube 126 as a result of months or years of settled use in the same position, making it very difficult to remove. This "stuck" condition is exacerbated because typically the conventional coalescer riser pack is of approximately the same cross-sectional dimensions as the riser tube (so as to fill the riser tube width and/or diameter), in order to minimize bypass of material through the coalescer portion of the riser tube. Embodiments of at least some of the presently described configurations address such problems.

Figure 5A:
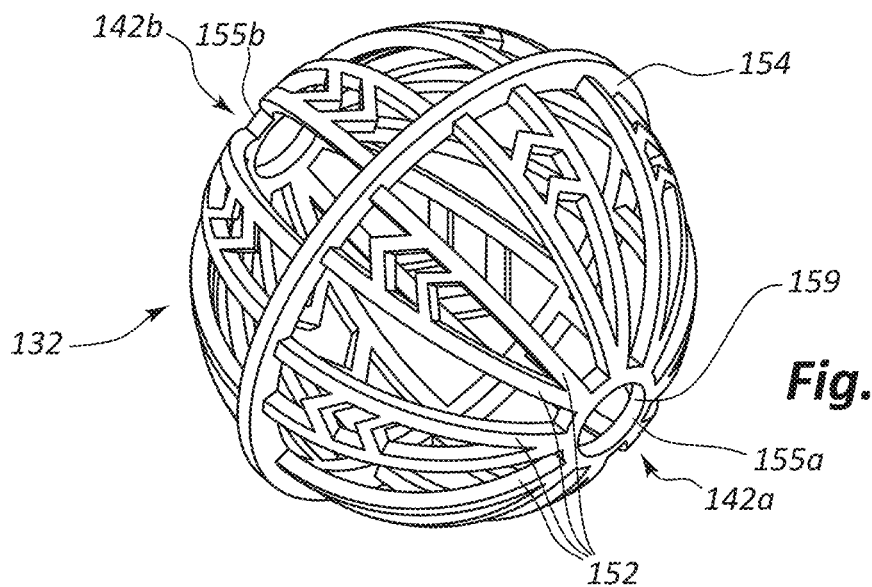
FIGS. 5A-5C show views of an simplified exemplary generally spherical coalescing member.
Figure 5B:
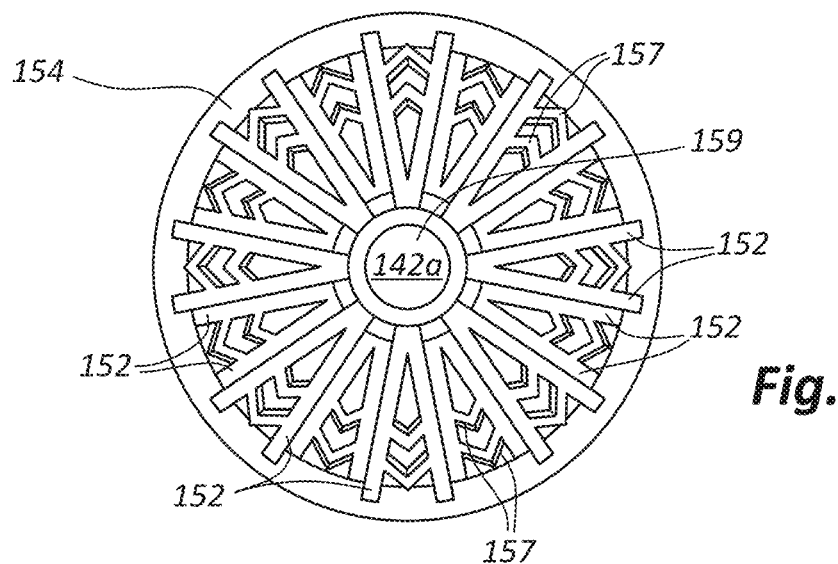
Figure 5C:
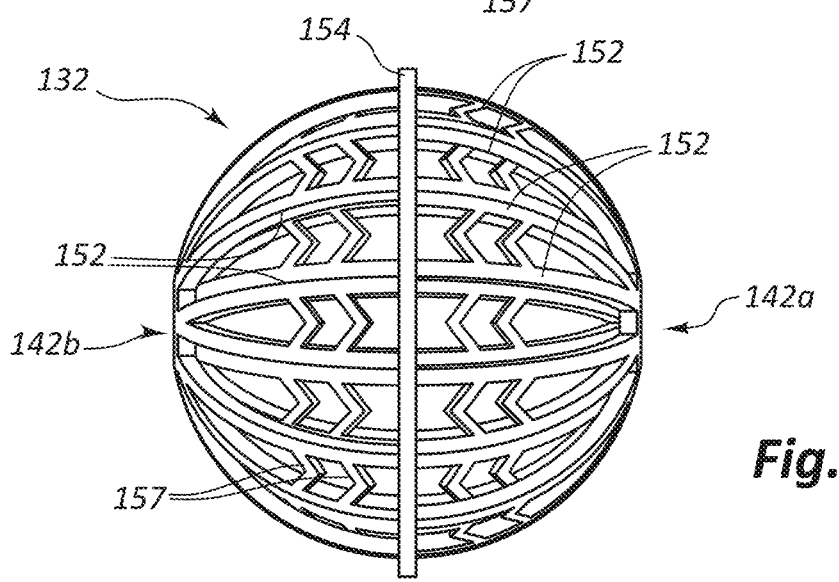

For example, as seen in FIGS. 3 and 4, in an embodiment, the coalescing members 132 may be in the form of generally spherical shaped coalescing members such as TELL-ERETTE spheres or balls. An exemplary generally spherical configuration is shown in FIGS. 5A-5C. Such generally spherical members may include a high void volume, and/or may include a high fraction of the overall generally spherical boundary that is open. In other words, a high fraction of the outer surface area of a closed generally spherical shape that would be the boundary of a given coalescing member 132 may be open. By way of example, a WIFFLE or similar type ball includes a relatively high fraction of the outer boundary of its sphere that is closed, rather than open. Even with the typical openings in the outside spherical boundary of a WIFFLE or similar type ball, the fraction that is open is typically relatively low, which would cause such a shape to "burp" up to the liquid surface as its interior filled with air. By way of example, coalescing member 132 may have opposing poles 142a and 142b each having a ring 155a and 155b formed thereat, respectively, with an opening 159 extending through each ring 155. A plurality of thin elongate strips 152 are spaced apart and extend in an arc between opposing rings 155a and 155b along the outer boundary. Another strip 154 may extend about the equator of the generally spherical coalescing member 132 at the outer boundary so as to centrally intersect with strips 152. The arc-shaped strips 152 may be staggered on opposed sides of equatorial strip 154, as shown. A very open outer spherical boundary is provided. Connecting members 157 (e.g., shaped as chevrons in this example) may also be provided that extend between adjacent strips 152.

Figure 5D:
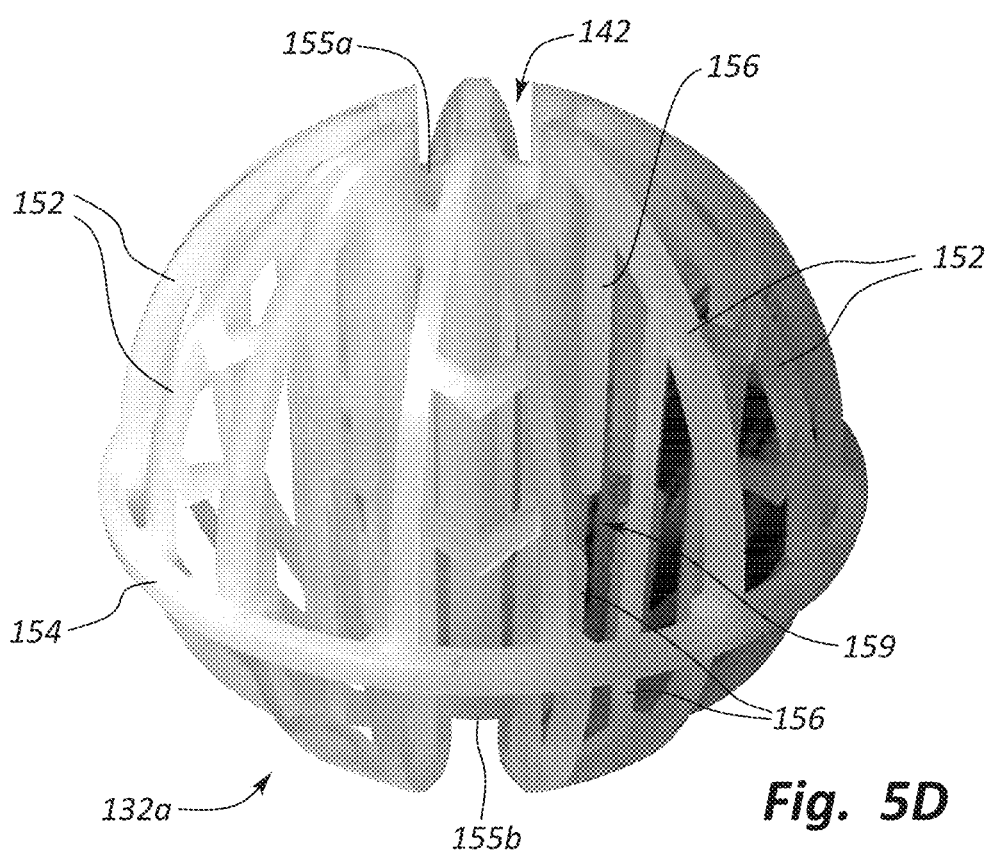
FIGS. 5D-5E are photographs of an exemplary generally spherical coalescing member similar to that represented by FIGS. 5A-5C.
Figure 5E:
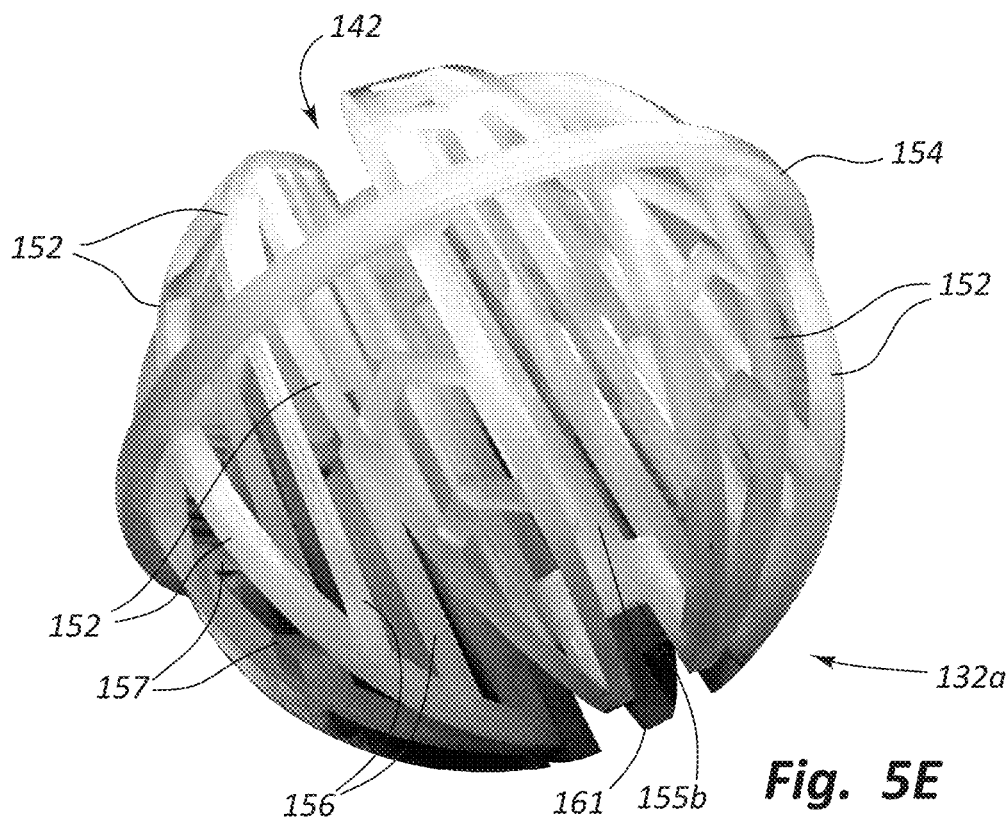

Depicted in FIGS. 5D and 5E is an alternative embodiment of a coalescing member 132a where like elements between coalescing member 132 and 132a are identified by like reference characters. In contrast to coalescing member 132 which is shown as hollow, coalescing member 132a has internal elongate members 156 that extend within the sphere between spaced apart points on strips 152. Specifically, each strip 152 can have one, two, three, four or more, spaced apart members 156 that extend between spaced apart points on the interior surface of the arced strip 152 (e.g., as chord lengths between portions of elongate strips 152). Members 156 can be linear, curved or have an irregular configuration. In other embodiments, members 156 can extend between different strips 152. Such members 156 increase the surface area provided by the coalescing member. In the depicted embodiment, rings 155a and 155b are recessed within the sphere and connect to each of the inner members 156 of each strip 152 to integrally form coalescing member 132a. Inner members 156 increase the tortuosity of pathways through the coalescing members 132a, thereby reducing linear bypass of feed stream 106 through the coalescing members, particularly when multiple coalescing members are packed together in different orientations relative to one another, and particularly where mounted on an axle running from pole to pole (e.g., mounted with the poles oriented horizontally). Photographic FIGS. 5D and 5E illustrate the highly tortuous pathway that results from such configurations. As shown in the photographs, some of the chord elongate members 156 (e.g., the innermost ones) may be discontinuous, with a break 159 therein. As will be apparent from the photographs, additional internal elongate members 161 may extend between ring 155a at or near one pole and ring 155b at or near the other pole. In an embodiment, rings may be of the same diameter, while in another embodiment, one ring (e.g., 155b) may be larger in diameter than the other, resulting in a channel 142 which is flared in width, becoming wider adjacent ring 155b. Such a configuration is shown in photographic FIGS. 5D and 5E.

It will be appreciated that although coalescing members having one or more specific generally spherical configurations may be shown, numerous alternative configurations can be achieved by changing the size, configuration, and pathway of strips 152 and members 156 which produce high fractions of open exterior boundary and/or high void volume fractions. While generally spherical coalescing members 132 may be principally depicted, it will be appreciated that coalescing members having other configurations can also be used. For example, the coalescing members could be cylindrical, cube, pyramid, cone, ellipsoid, prism, polyhedron or other configuration. Such other shapes may include the desired void volume and open outer boundary characteristics.

By way of example, the coalescing members disclosed herein may exhibit a void volume of at least 80%, 82%, 84%, 86%, 88%, 90%, 92%, 94%, or 96% or in a range between any two of the foregoing. Other values can also be used. The open fraction along the boundary of the coalescing members is also relatively high and is typically at least 50%, 55%, 60%, 65%, 70%, 75%, 80%, 85%, or 90% or in a range between any two of the foregoing. Other values can also be used. Such high void volume and high open outer boundary characteristics allow the liquid material of the feed stream 106 that is moving up through the riser tube 126 to pass through the coalescing members (without them burping to the liquid surface), generally along a tortuous pathway, resulting from the intersection of the various structural members of the coalescing members 132, both along its outer portions, and within its interior.

The coalescing members 132 may have a tortuosity greater than 1.0. For example, tortuosity may be defined as the ratio of the total length traveled along the tortuous pathway through and/or around the coalescing member(s) divided by the linear line distance between the two points. In other words, tortuosity is a measure of the "meandering" characteristics of the pathway of the liquid feed stream as is passes through the coalescing members 132. For example, for a tortuosity value of 1.1, the actual length traveled between two points is 10% greater than the straight line distance between the two points. For a tortuosity value of 1.2, the actual length traveled would be 20% greater. For a tortuosity value of 1.0, the pathway would simply be a straight line, without any deviations. Tortuosity can be measured both in terms of an individual coalescing member, such as between opposing poles or opposing sides of a coalescing member, and in terms of a path through a groups of coalescing members, such as between lower end 141 and upper end 143 of grouped coalescing member 132 within riser tube 126 as shown in FIG. 3. In one embodiment of the present invention, the tortuosity of one coalescing member and/or a group of coalescing members, such as between opposing sides or opposing ends, may be at least 1.05, 1.1, 1.2, 1.3, 1.4, 1.5, 1.6, 1.7, 1.8, 1.9, 2.0, or within a range of any two of the foregoing values. Other values can also be used.

Such coalescing members also may exhibit relatively high surface area to volume characteristics. For example, the coalescing members may have a surface area to volume ratio of at least or less than 20 $ft^2/ft^3$ (65 $m^2/m^3$), 25 $ft^2/ft^3$ (82 $m^2/m^3$), 30 $ft^2/ft^3$ (98 $m^2/m^3$), 35 $ft^2/ft^3$ (114 $m^2/m^3$), 40 $ft^2/ft^3$ (131 $m^2/m^3$), 45 $ft^2/ft^3$ (148 $m^2/m^3$), 50 $ft^2/ft^3$ (164 $m^2/m^3$), 55 $ft^2/ft^3$ (180 $m^2/m^3$), 60 $ft^2/ft^3$ (197 $m^2/m^3$), 65 $ft^2/ft^3$ (213 $m^2/m^3$) or 70 $ft^2/ft^3$ (230 $m^2/m^3$) or in a range between in any two of the foregoing.

Although coalescing members can be any desired size, coalescing members typically have a maximum diameter of at least or less than 3 cm, 5 cm, 7 cm, 9 cm, 11 cm, 13 cm, 15 cm, 20 cm, 25 cm, or 30 cm or in a range between any two of the foregoing. Other dimensions can also be used. As used herein a "diameter" refers to a straight line passing from side to side through the center of a body and is applicable to all shapes, is not limited to circles or spheres. The coalescing members can be manufactured from various plastic materials such as polypropylene, polyethylene, PVC, and the like. As a result, the coalescing members are lightweight, inexpensive, and do not rust or otherwise corrode.

Packing materials available from Verantis Corporation out of Middleburg Heights, Ohio and sold under the tradename TELLERETTES are one example of a structure that could be used as a coalescing member in the present invention.

The coalescing members 132 serve to slow down the flow velocity of the liquid feed stream 106 as it flows up riser tube 126, increasing the residence time within the riser tube 126, particularly within the coalescing portion (between points 141 and 143 of FIG. 3) of the riser tube 126. For example, the riser tube 126 and coalescing members 132 may be configured to provide a rise rate of the feed stream 106 within the riser tube 126 from about 2.5 inches/s (6.35 cm/s) to about 5 inches/s (12.7 cm/s), from about 3 inches/s (7.6 cm/s) to about 4 inches/s (10.2 cm/s), e.g., about 3.5 inches/s (8.9 cm/s). By way of example, for a riser tube height of about 60 inches (152 cm), the top 20 inches (51 cm) may be packed with coalescing members 132. For example, at least 5%, at least 10%, at least 20%, at least 30%, less than 70%, less than 60%, less than 50%, from 10% to 60%, from 20% to 50%, or about 30% of the height of the riser tube 126 may be packed with coalescing members 132. Other configurations are of course possible, with more or less of the overall riser tube height being filled with coalescing members 132. In an embodiment, the coalescing members 132 may be disposed in the top portion of the riser tube (e.g., between points 141 and 143), although in some embodiments, the coalescing members 132 could be positioned within another portion of the riser tube 126, (e.g., a central portion thereof, a bottom portion thereof, or the full length could be packed with coalescing members 132).

The number of coalescing members 132 used within a riser tube 126 depends in part on the size of coalescing members 132 and the size of riser tube 126. However, it is common that the number of coalescing members 132 positioned within a riser tube 126 be at least 10, 15, 20, 25, 30, 40, 50, 60, 80, 100, 150, 200, 250 or in a range between any two of the foregoing. Other numbers can also be used. Although coalescing members 132 within a riser tube 126 can all be the same size and configuration, in one embodiment to help maximize packing of coalescing members 132 within a riser tube 126, it is appreciated that at least 2, 3, 4, 5, 6 or more different sizes and/or different shapes of coalescing members 132 can be used within a riser tube 126.

Positioning the coalescing members 132 within the top portion of the riser tube 126 aids in coalescence of suspended impurities, e.g., oils and particulates, as the feed stream 106 passes up through the riser tube 126, and aids in reducing the rise rate to within a desired range. At the bottom of the riser tube 126 (e.g., adjacent inlet 124), the polymer, any other injected additives, and the very small induced gas bubbles begin to cause agglomeration of the tiny oil droplets and other impurities to be removed from the feed stream 106. For example, oil droplets having an average size of about 10 microns may grow under such conditions to about 40-50 microns in size. As the very small bubbles injected into the feed stream by inducer 102 pass up through riser tube 126, they grow in size, particularly as they pass through the coalescer portion of riser tube 126, between 141 and 143 (FIG. 3). As previously discussed, a foamed portion of the resulting stream (which includes the impurities entrained therein) floats to the top of riser tube 126 and passes into outer chamber 140 while the purified liquid also flows into outer chamber 140. The purified liquid can be withdrawn out bottom outlet 128 as wastewater stream 114. The foamed portion of the feed stream 106 including the concentrated impurities entrained therein may be withdrawn through outlet 127 at the upper end of coalescing tank as contaminate stream 112 shown in FIG. 3. Any gaseous effluent stream disposed above the foamed stream (e.g., stream 110 shown in FIG. 1) may also be withdrawn through an appropriate outlet at the top of coalescing tank 100. If desired, such a gaseous stream could be recycled back to gas inducer 102, for induction of the gas into the wastewater stream 104. As mentioned, additional details of such output streams are described in U.S. Pat. Nos. 5,080,802 and 8,425,668, already incorporated by reference.

As described herein, use of such a system, e.g., particularly where desired polymer is injected into the feed stream 106 entering into coalescing tank 100, can result in clogging of the riser tube 126 within the coalescing portion thereof, even under conditions where care is taken to carefully monitor and adjust polymer injection, concentration, etc. By providing coalescing tank 100 with one or more of: (1) coalescing members which can rotate within the flow, to reduce fouling; (2) relatively small coalescing members which can be freely removed should they become fouled; and/or (3) coalescing members that can otherwise be easily removed (e.g., coalescing member segments that can be inserted and removed from a larger combined coalescer assembly) piecemeal from the riser tube 126 and coalescing tank 100 if needed, the problems associated with potential clogging are greatly diminished.

In some embodiments, the coalescing members 132 may be configured to be rotatable within the flow of feed stream 106. FIGS. 5A-5C illustrate various views of an exemplary generally spherical coalescing member 132, which can be configured to rotate within the flow of feed stream 106. As seen in the Figures, coalescing member 132 may include a channel 142 (e.g., cylindrical, centered along the pole-to-pole longitudinal axis of coalescing member 132, through which an axle 144 (FIG. 6) may be inserted, allowing coalescing member 132 to rotate about axle 144. Other mechanisms for providing rotation of the coalescing members could alternatively or additionally be used.

Figure 6:
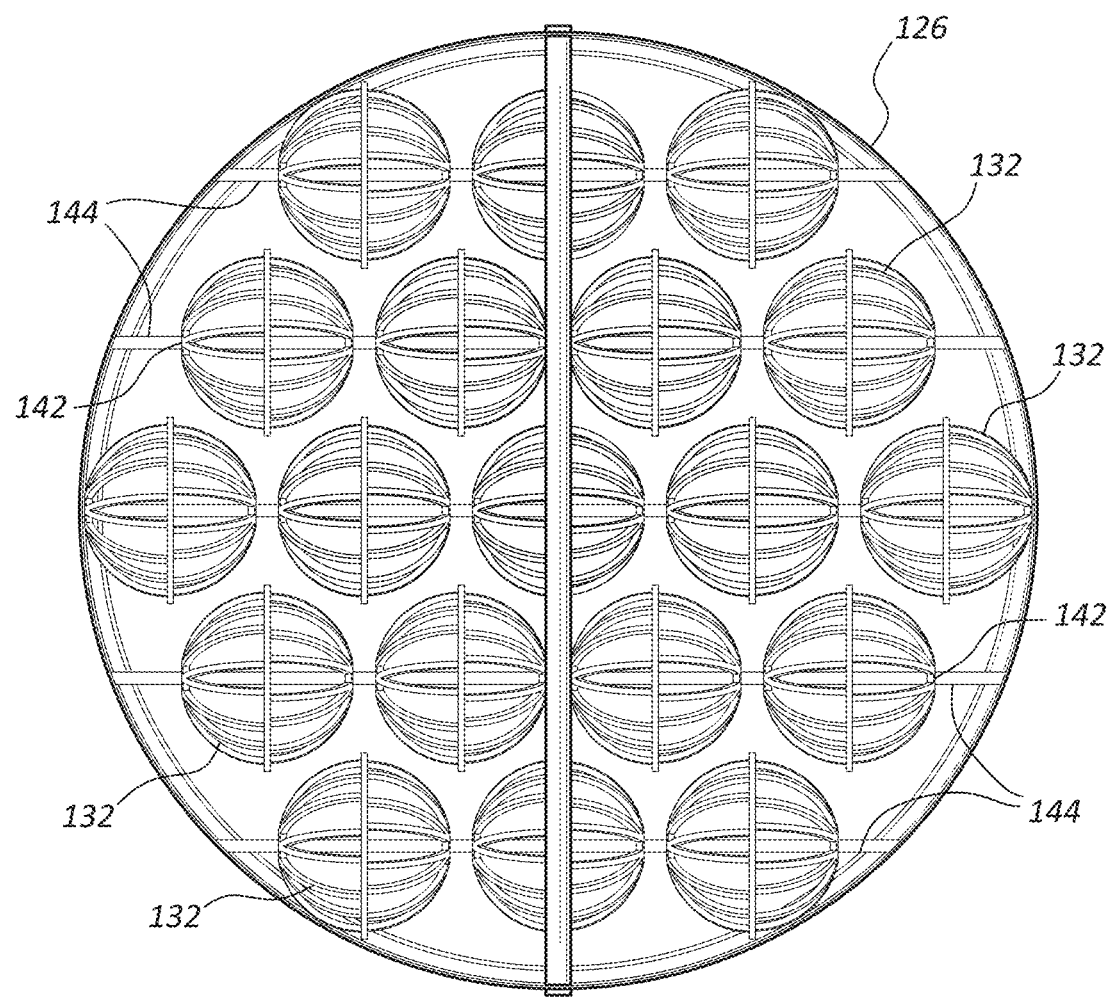
FIG. 6 shows a layer of spherical coalescing members for placement within the riser tube of the apparatus, where at least some of the coalescing members are disposed on an axle so as to rotate within the liquid influent flow.

FIG. 6 shows how a plurality of coalescing members 132 may be mounted on a plurality of spaced apart axles (e.g., generally horizontal) 144. Axles 144 may be mounted to riser tube 126 or to a basket 146 or other structure that may be disposed within (e.g., lowered down into) riser tube 126. In one embodiment, one layer of spaced apart axles 144 can be disposed in parallel alignment in a horizontal plane. In other embodiments, axles 144 could be vertically staggered, inclined at a common angle or at different angles and can be disposed as converging or diverging. General horizontal orientation of the axles 144 (and thus coalescing members 132 mounted thereon) may also aid in minimizing any "bypass" that might otherwise occur as the feed stream 106 passes up through the coalescing member(s) 132. For example, it would be undesirable that material of feed stream 106 could move upward the distance of the coalescing member 132 by simply passing through central channel 142, through which axle 144 is received. While axle 144 may occupy a significant fraction of the volume of channel 142, were channels 142 to be oriented vertically or generally vertically, at least portions of feed stream 106 could bypass any tortuous movement through coalescing members 132 by linearly traveling upward through the channel between the axle and the interior boundary of the channel. Horizontal (or generally horizontal) positioning of the axles 144 and channels 142 thus aids in preventing or minimizing any such bypass. In addition, the particular illustrated structure of coalescing members 132 (see FIG. 5B) may be more susceptible to bypass (tortuosity of 1, or nearly 1 on a bypass pathway) through other portions of the spherical coalescing member 132, when in a vertical or generally vertical orientation. In a horizontal or generally horizontal orientation, the pathway from below to above, through the coalescing member 132 is much more occluded, and tortuous, which is desired in slowing down the flow within the coalescing portion of the riser tube 126, between 141 and 143. Such will be apparent from the photographic FIGS. 5D and 5E. This occluded, tortuous pathway is even more particularly characteristic where an axle 144 is provided within channel 142. When rotated so that the axle is horizontal (or generally so), the elongate members 156 positioned as chord lengths relative to arced boundary strips 152 provide the desired occluded, tortuous pathway, minimizing the presence of any bypass channels. Such elongate members 156 disposed internally as chord lengths (or in some cases broken, discontinuous chord lengths) between the arcuate boundary strips 152 obstruct bypass channels that might otherwise be open when the coalescing member is oriented with channel 142 running horizontally, perpendicular to the generally vertical upward direction of flow of stream 106. In addition, in such an orientation, the generally perpendicular upward flow may tend to cause rotation (e.g., either clockwise or counter-clockwise) of coalescing member 132 about axle 144. Such rotation may reduce adherence of oil, solids, and other materials being removed from the feed stream 106 by coalescing tank 100, allowing these materials to preferably exit through contaminate stream 112, rather than building up on the coalescing members 132. It will be appreciated that FIGS. 5A-5C, and FIG. 6 show a simplified structure for coalescing members 132, without elongate chord members 156, for simplicity, although it will be appreciated that photographic FIGS. 5D-5E show a preferred configuration, with such internal elongate members 156 oriented as chords relative to arcuate boundary members 152.

By generally horizontal, it will be apparent that the channel 142 (and/or axle 144) may be actually horizontal, or at some preferably minor incline or decline relative to horizontal, where horizontal may be defined as perpendicular to the general direction of fluid flow within riser tube 126 (which flow is generally vertical). By way of example, generally horizontal may be within about 5°, within about 10°, within about 15°, within about 20°, within about 25°, or within about 30° of horizontal. In some extreme cases, orientation may possibly be within about 35°, within about 40°, or within about 45° of horizontal, although closer to horizontal orientation may be preferred due to potential bypass concerns, as well as loss of rotation velocity, as described herein. References to generally vertical could be similarly defined (e.g., within about 5°, within about 10°, within about 15°, within about 20°, within about 25°, within about 30°, within about 35°, within about 40°, or within about 45° of vertical).

Figure 7:
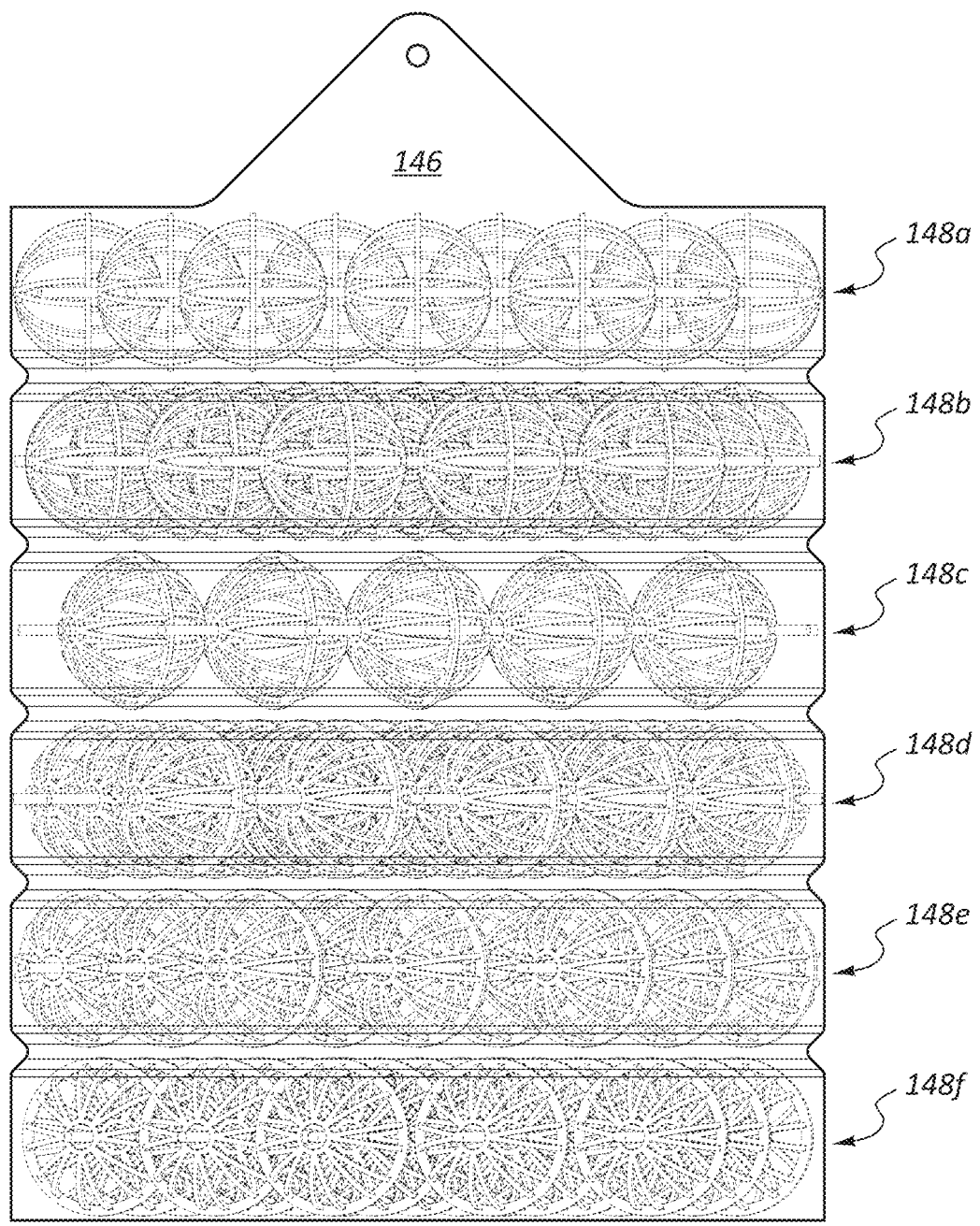
FIG. 7 is an elevation cut-away view into a removable basket for placement into the riser tube, which basket includes a plurality of layers of coalescing members, where the coalescing members of the various layers may be mounted on axles.

FIG. 6 further shows how the coalescing members 132 may be rotatably mounted on axle(s) 144. In addition, it will be apparent that the coalescing members 132 may also slide (e.g., generally horizontally) along the length of the axles 144 on which any given coalescing member 132 is mounted. In order to prevent or minimize the possibility of any bypass occurring between coalescing member 132 as the feed stream 106 flows up from the bottom to the top of the riser tube 126, multiple layers of the coalescing members 132 and axles 144 may be provided within riser tube 126. The axles 144 of such layers may be vertically offset relative to one another, i.e., not in vertical alignment, so that if bypass is possible through one layer of coalescing member 132, another of the layers of coalescing member 132 occludes such bypass pathway. For example, FIG. 7 shows a configuration including 6 layers of axle mounted coalescing members 132, labeled as layers 148*a*-148*f*. More or fewer layers may of course be provided. For example, 2, 3, 4, 5, 7, 8 or more layers could be provided. As discussed below in more detail, such layers do not necessarily require that coalescing members 132 be mounted on axles 144. For example, sufficient coalescing members 132 could simply be packed within riser tube 126 (or in a basket in riser tube 126), where sufficient numbers of coalescing members 132 are provided so that they form more than a single layer of coalescing members 132 across the top of riser tube 126. FIG. 11 illustrates such an embodiment, while FIGS. 7-10 illustrate the coalescing members 132 on axles 144. Such coalescing members 132 may be provided on axles 144 within a basket, or the axles 144 may be secured directly within riser tube 126. Providing a basket may advantageously allow the coalescing members 132 (and axles 144) to be easily pulled from riser tube 126 and lowered therein for replacement of the coalescing members 132.

Figure 8:
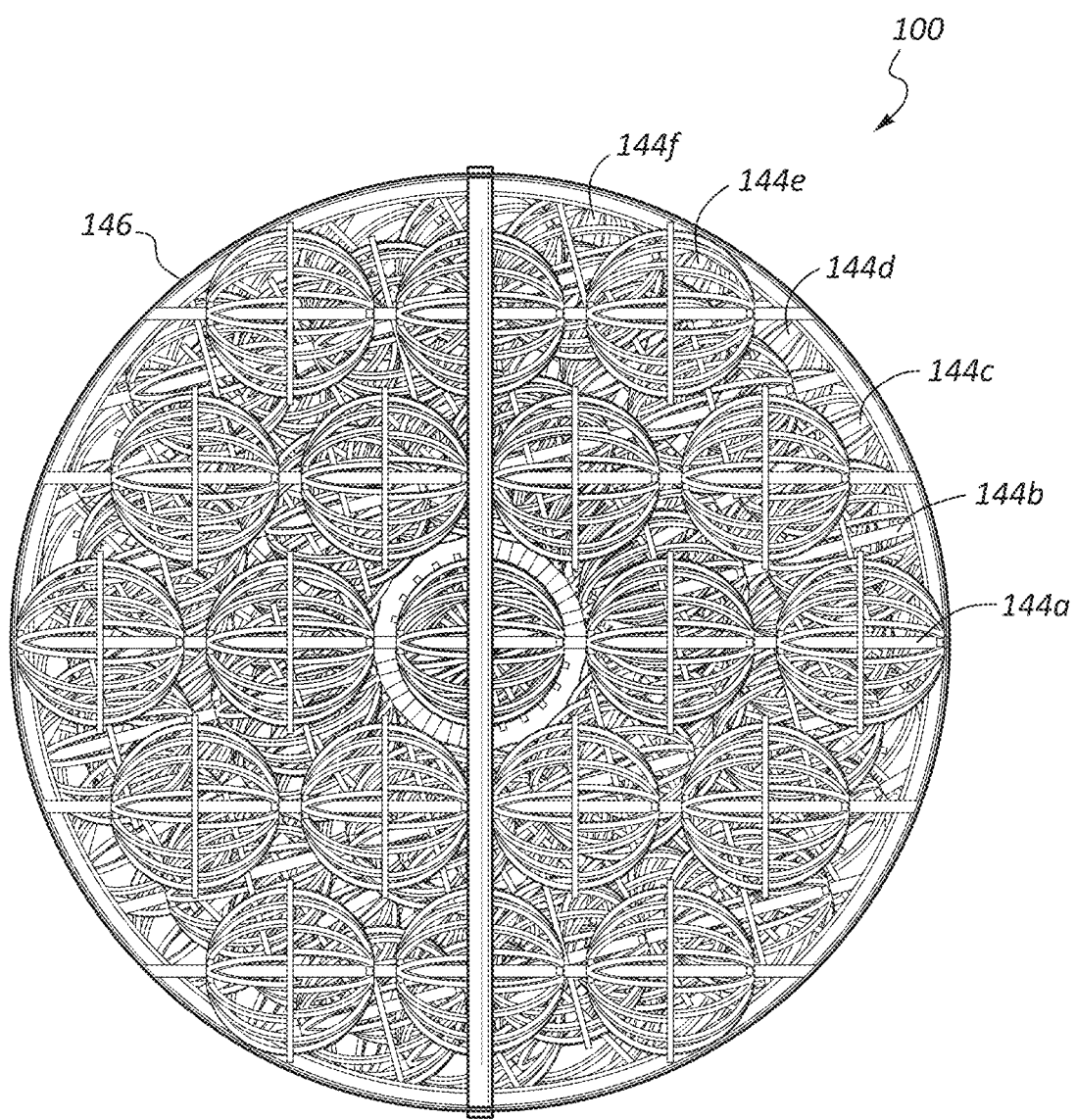
FIG. 8 is a top down plan view into the plurality of layers of coalescing members within a basket such as that of FIG. 7, where each coalescing member is mounted on an axle, and where the axles of adjacent layers are offset relative to one another to minimize any generally vertical bypass channels.

As represented in FIGS. 7-8, the orientation of adjacent layers 148 (e.g., 148*a*-148*f*) may be offset relative to one another. For example, each successive layer through the stack of layers 148 may include axles 144 that are angled at an offset relative to the axles 144 of the adjacent layer that is just above or below a given layer. For example, the axles 144 of layer 148*a* may be oriented as seen in FIG. 6 (e.g., at 0°). All axles within a given layer may be parallel to one another. Adjacent layer 148*b* may be oriented at an offset, so that axles 144 of layer 148*b* are offset at 15° relative to the axles 144 of layer 148*a*. For example, the longest axle of layer 148*b*, passing through a center (marking a diameter) of riser tube 126 or basket 146, may be offset by 15° relative to the orientation of the longest axle of layer 148*a* (e.g., see axles 144*a* and 144*b*, respectively, labeled in FIG. 8). The longest (e.g., diameter defining) axles (144*c*-144*f*) of successive layers 148*c*-148*f* may similarly be offset relative to one another (e.g., by 15° from one layer to the next). Thus, axles of any given layer may be generally parallel to one another, while being offset by a given angular amount relative to the adjacent layer.

As shown in the illustrated configuration of FIG. 8, with 6 layers of thickness 148*a*-148*f*, the angular offset from one layer to the next of the axles may be equally divided over 90° of rotation (e.g., 90° of offset or rotation divided by 6 layers=15° offset per layer). In other embodiments, the offset may be divided over a larger total offset (or rotation), e.g., 180°, or 360°, etc. In the illustrated configuration, the offset from one layer to the next is equal (e.g., each 15°), although in other embodiments, it will be appreciated that the offsets from one layer to the next may not necessarily be equal to one another. In other words, a total rotation or offset desired (e.g. 90°, 180°, 360°, etc.) may or may not be divided equally between the given number of layers.

FIG. 8 shows a particular orientation of each of the spherical coalescing members 132, showing a spherical coalescing member 132 at the center of the longest of each axle, and showing a gap between the center coalescing member 132, and adjacent, more outer disposed coalescing members 132, so as to better show the offset orientation of each of the center, diameter-defining axles 144*a*-144*f*. It will be appreciated that in actual use, no such large central ring-shaped gap may be present, as the coalescing members may slide along their axle, filling in such a gap, to prevent bypass through such a gap. The illustrated configuration shows 5 coalescing members on the central axles, with 5 axles in each layer, with 4 coalescing members on the middle axles, and 3 coalescing members on the end, shortest axles (see FIGS. 6 and 8). Such a configuration provides 19 coalescing members 132 per layer, with 114 coalescing members within the 6 layers. It will be appreciated that such a configuration is merely exemplary, and more or fewer coalescing members 132 may be provided per axle, per layer, and more or fewer layers provided, as desired. The specific selection of such parameters may affect the rise rate of the feed stream 106 up through riser tube 126. More dense packing of the coalescing members 132 (e.g., more layers, more elongate members or strips filling the volume of each coalescing member, and the like) may act to decrease the rise rate. In addition, providing more, smaller diameter coalescing members per layer may increase the tortuosity and decrease the rise rate of the feed stream through the riser tube 126.

The illustrated configuration may be exemplary of a riser tube diameter of about 18 inches (46 cm) to about 20 inches (51 cm), with coalescing members having a diameter of about 3.5 inches (9 cm) to about 4 inches (10 cm). It will be appreciated that for larger diameter riser tubes, more than the illustrated 19 coalescing members may be needed per layer, to provide coverage over the surface area of the given riser tube diameter.

Figure 9A:
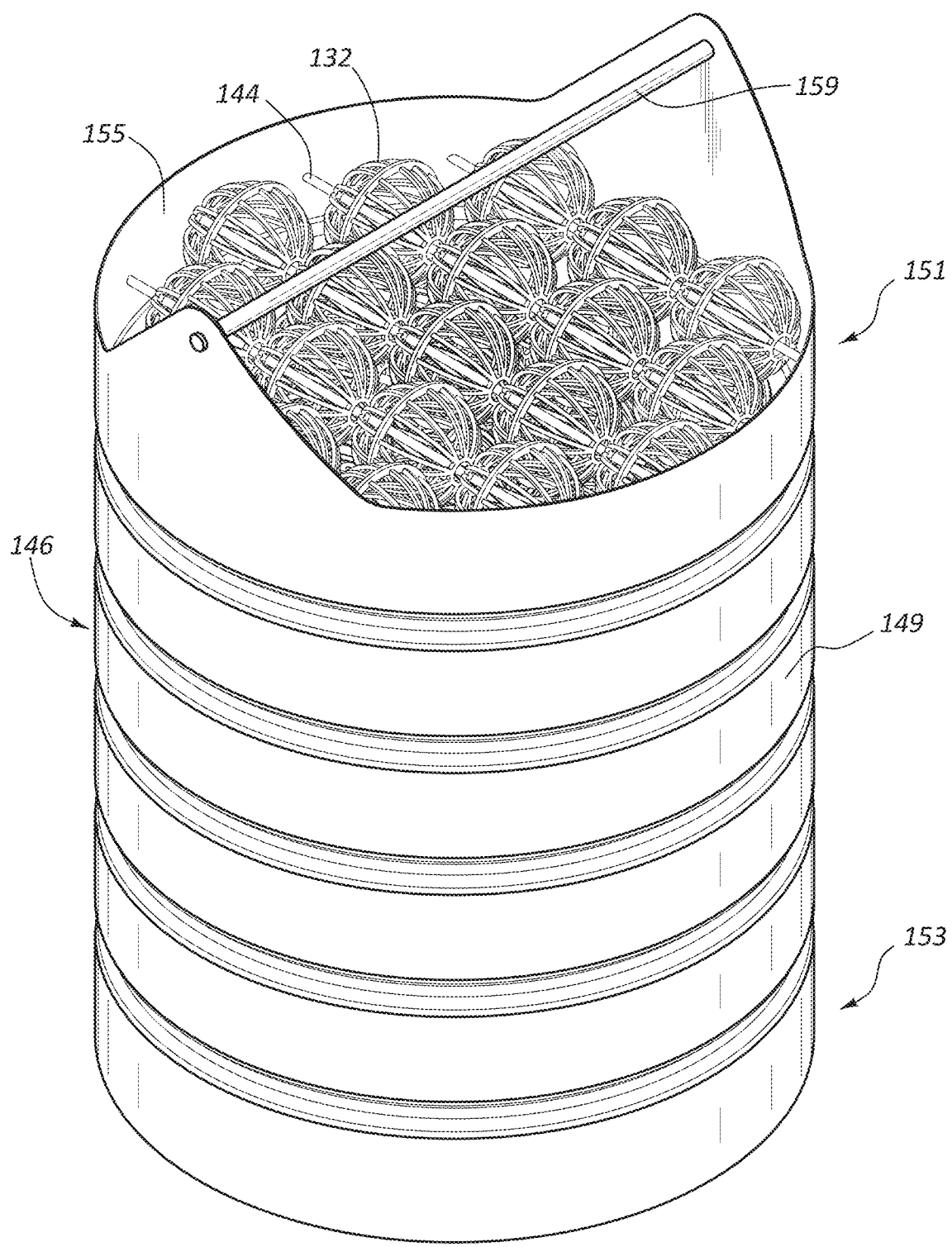
FIG. 9A is a perspective view of an exemplary removable basket filled with coalescing members for inserted into the riser tube.
Figure 9B:
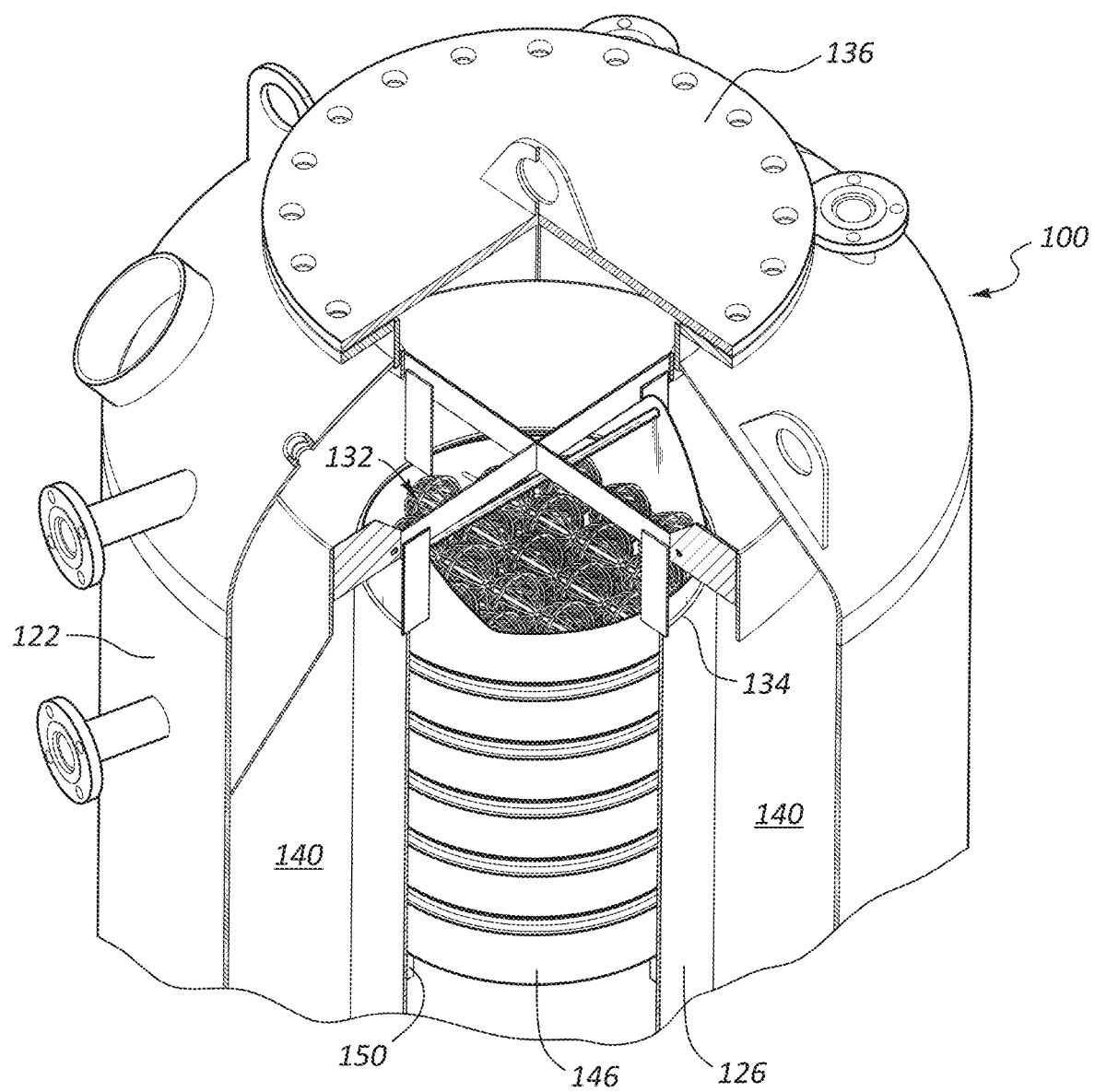
FIG. 9B is an exploded view, showing how a removable basket with the coalescing members may be inserted into the riser, so as to rest on a flange in the riser tube.

In one alternative embodiment, it is appreciated that adjacent layers of coalescing members 132 need not be offset by an angle to prevent bypass. For example, depending in part on the size of coalescing members 132, axles 144 can be laterally offset in different rows so that coalescing members 132 are not vertically aligned. That is, all axles 144 in all rows may be disposed in parallel alignment but axles 144 and the coalescing members 132 thereon are laterally offset in adjacent rows so that they are not vertically aligned. Such offset can be designed so as to preclude portions of feed steam 106 from bypassing coalescing members 132 as feed stream 106 passes up through riser tube 126. In this embodiment and in all other embodiments herein, it is appreciated that different sizes and/or different shapes of coalescing members 132 can be used on the same row, on different rows of the same layer and/or in different rows to more fully occupy the space, i.e., increase packing density of coalescing members 132, within riser tube 126 and to help preclude or minimize feed stream 106 bypassing coalescing members 132 as feed stream 106 passes up through riser tube 126. FIGS. 9A-9B illustrate an exemplary basket 146 for placement within riser tube 126. In general, basket 146 comprises an encircling sidewall 149 that extends between an upper end 151 and an opposing lower end 153. Sidewall 149 bounds an open throughway 155 that extends between opposing ends 151 and 153 and through which feed stream 106 passes as feed stream 106 travels up riser tube 126. In the depicted embodiment, a handle 159 is shown disposed at upper end 151. Handle 159 can be used for removing and replacing basket 146 within riser tube 126. Although handle 159 is shown as a bar that extends between opposing sides of sidewall 149, handle 159 can have a variety of different configurations. For example, the handle can comprise one or more openings or recesses formed on sidewall 149 or one or more projections extending from sidewall 149.

Furthermore, although basket 146 is shown as having a solid continuous sidewall 149, in alternative embodiments, sidewall 149 can have any number of openings formed therethrough. Likewise, sidewall 149 can be formed of a mesh or screen. In still other embodiments, sidewall 149 may simply comprise a frame having sufficient structure to support axles 144. For example, the frame could comprise a ring disposed at upper end 151 and a ring disposed at lower end 153 and a plurality of members such as straps or bars that extend between the opposing rings between which the axles 144 extend.

Where axles 144 are not used and basket 146 is used to freely capture and retain coalescing members 132, the above structures can again be used for basket 146 as long as any openings formed in sidewall 149 are sufficiently small to preclude coalescing members 132 from passing out therethrough. However, as discussed below in more detail, where axles 144 are not used, a floor needs to be formed in throughway 155 at lower end 153 that support coalescing members 132 within basket 146 but still allows feed stream 106 to flow through throughway 155 and thus through coalescing members 132 disposed therein.

The above discussed removable and re-insertable basket 146 may greatly facilitate the ease by which a user may withdraw coalescing members 132 from the riser tube 126, should they desire to inspect the coalescing members 132 (e.g., for degree of fouling), to replace one or more coalescing members 132, and the like. As seen in FIG. 9B, the bottom of basket 146 may rest on a flange 150 within the interior of riser tube 126. Where coalescing members 132 are mounted on axles 144 (with or without a basket), or otherwise retained within a basket 146, no floor is needed to keep the coalescing members 132 from falling into a lower portion of riser tube 126.

Figure 10:
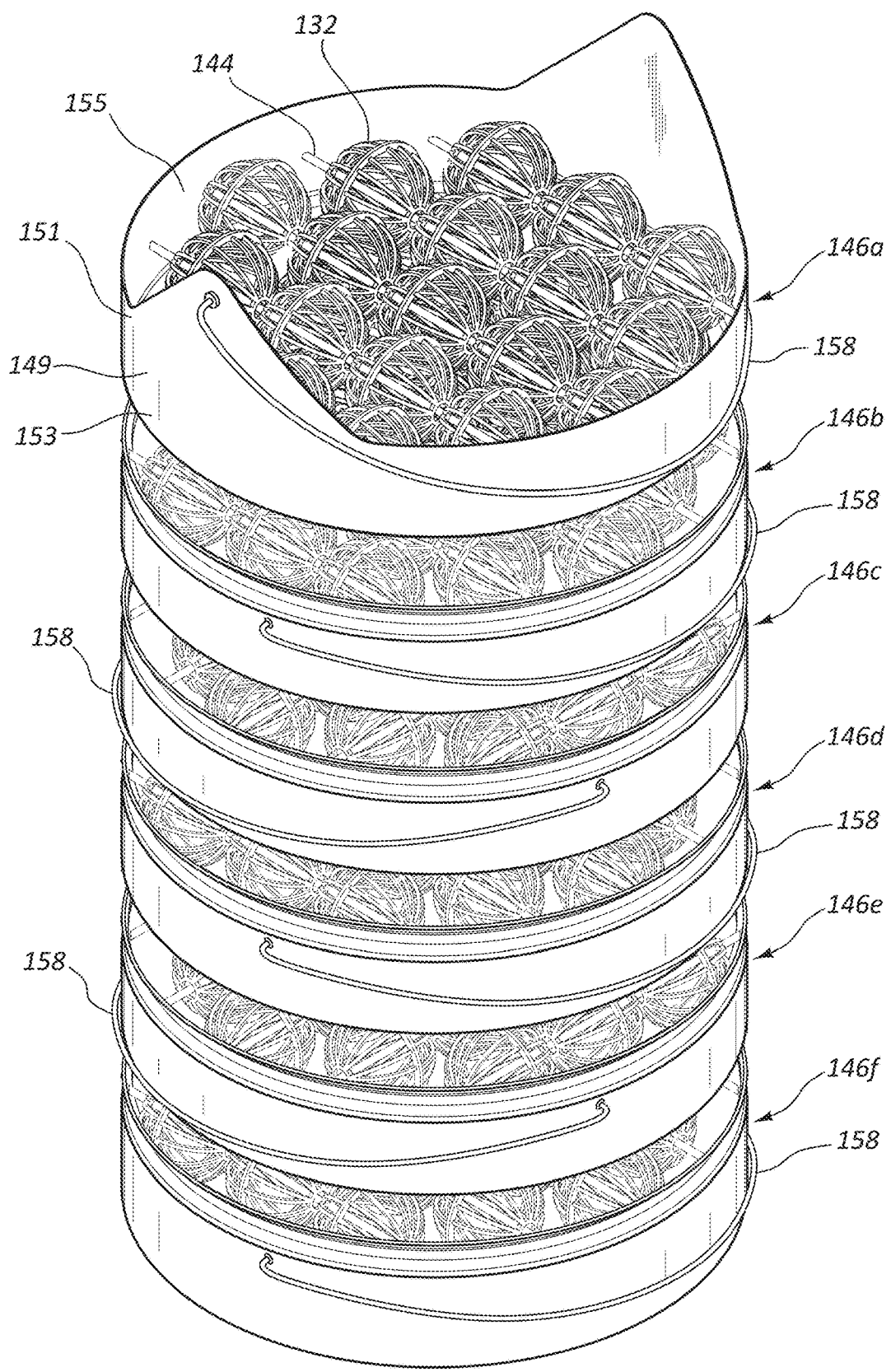
FIG. 10 is an exploded view of a removable basket assembly configured as separate baskets that may be stacked one upon another within the riser tube, for easy removal of the baskets, and the coalescing members contained therein.
Figure 11:
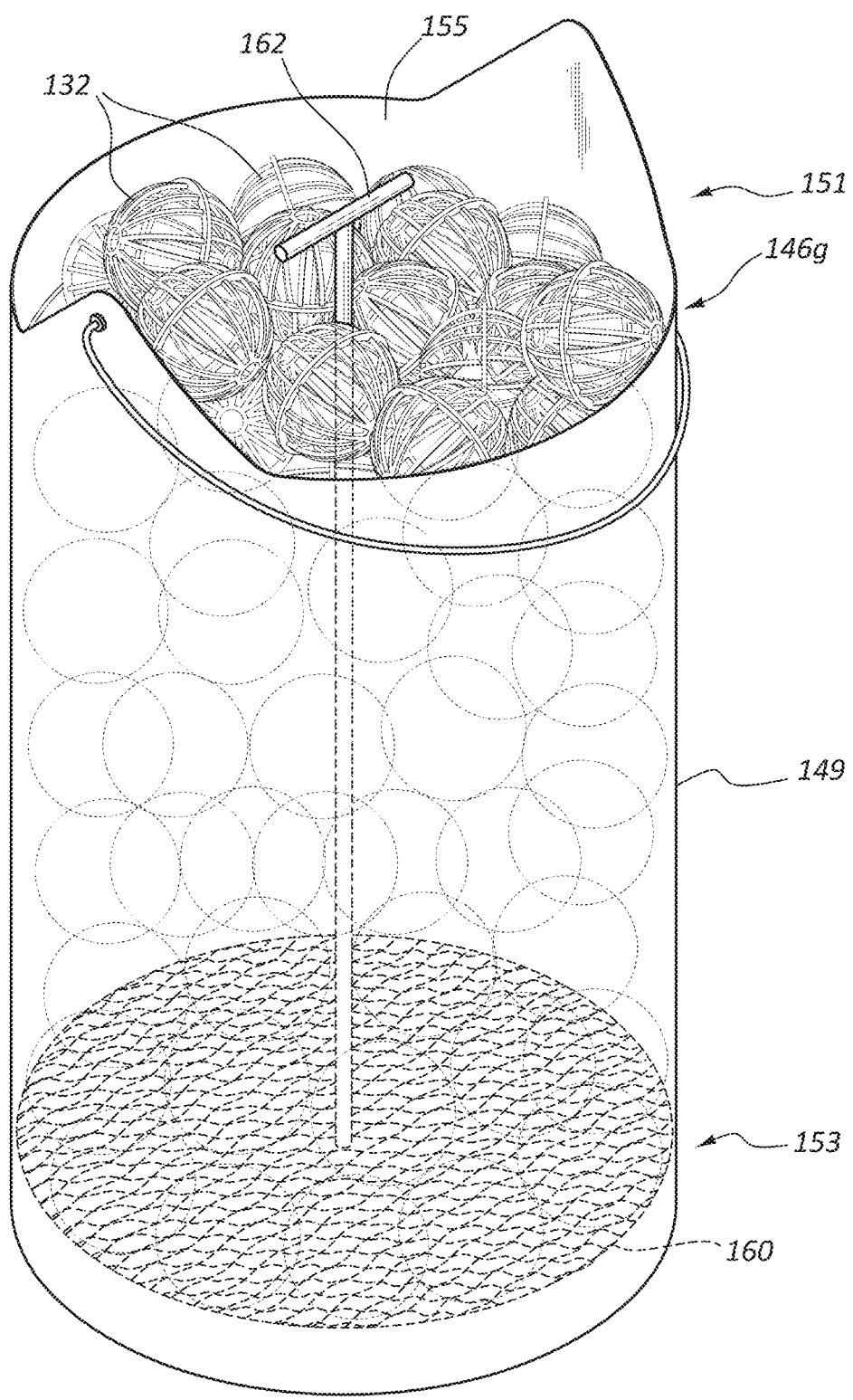
FIG. 11 shows another configuration including coalescing members positioned (e.g., packed) within the riser tube without the coalescing members being mounted on axles (e.g., randomly packed therein)

FIG. 10 shows an alternative embodiment where a plurality of baskets 146a-146f may be stacked one upon another. For example, each basket 146a-f may include one or more layers of coalescing members 132. FIG. 10 shows the same 6 layers of coalescing members as in FIGS. 8-9B, but with each layer within its own basket, for easy insertion and removal within riser tube 126. If desired, more than a single layer of coalescing members 132 could be provided within each such basket (e.g., 2 or 3 layers per basket). Dividing the total coalescing portion thickness (between 141 and 143 in FIGS. 3-4) between a plurality of baskets reduces the weight of each basket, making their insertion and removal easier. This is particularly helpful when removing the baskets, where, due to fouling, the weight of each basket may be significantly greater than when the clean baskets and coalescing members 132 were installed.

For example, it has been discovered that when removing a conventional coalescer riser pack from an existing IGF apparatus, the weight of the plugged conventional coalescer riser pack may be 4 to 5 times greater than that of the clean coalescer riser pack. Thus, even if the present inventive coalescing members and/or baskets were to become clogged, by dividing the coalescing structure into modular portions, which could be removed independently, e.g., one stacked section after another, the ease of removal and replacement is greatly enhanced. Removal may thus be relatively easily accomplished manually, without the need for a crane to lift a very heavy plugged coalescer structure. Similarly, the replacement clean coalescer basket(s) may also be placed (e.g., lowered) into the riser tube 126 using just manual effort, without the need for a crane.

Each basket 146a-146f can have the same elements and designs and can be made of the same materials as basket 146 discussed above and like elements between basket 146 and baskets 146a-f are identified by like reference characters. In one embodiment, baskets 146a-f are designed to rest or nest on top of each other, i.e., baskets 146a-f can be vertically stacked, without interfering with the ability of coalescing members 132 to rotate on axles 144. Each basket 146a-146f may advantageously include a handle 158 that can be grasped and used to more easily lower and raise a given basket within riser tube 126. In this embodiment, handle 158 comprises a member, such as a wire or rod, that spans between opposing sides of sidewall 149. Handle 158 is pivotably mounted at each end to sidewall 149 so that handle 158 can be pivoted out of the way when baskets 146a-f are stacked. The handles of the lower basket layers may be made longer than the higher basket layers, if desired, to allow a user to reach the handles more easily, even where the basket layer may rest on flange 150, a considerable distance down riser tube 126. For example, handle 158 of baskets 146f and 146e may be longer than handles of baskets 146a and 146b, as these baskets will be lower within riser tube 126 when installed, to allow the handles 158 to be more easily reached by a user trying to remove (or lower) the basket. Alternatively, a simple hook could be used to reach any desired handle 158, to lift its associated basket out. Again, handles of other configurations can also be used.

As described above, in one alternative, axles 144 can be eliminated and coalescing members 132 can be freely disposed within the riser tube 126 or within a basket that is supported within riser tube 126. As used herein, the term "freely disposed" means that the coalescing members 132 are not directly secured to a separate structure such as by mechanical attachment or chemical adhesion and are not restrained by a separate structure that passes partially or fully through coalescing members and thus are independently movable. For example, loose spherical or other coalescing members of one or more shapes and sizes may simply be packed or otherwise positioned within the riser tube 126 so that they are freely disposed therein. As depicted in FIG. 4, a liquid permeable floor 163 can be positioned within riser tube 126, typically at a location upwardly spaced from the floor of coalescing tank 100, so as to support coalescing members 132 within riser tube 126. Liquid permeable floor 163 can be formed of wire, mesh, screen, rods, bars, a plate with holes formed therethrough or other structures that will support coalescing members 132 but will allow feed stream 106 to flow therethrough. Floor 163 can be fixed within riser tube 126 or removably positioned on flange 150 or other supporting structure.

As depicted in FIG. 11, a basket 146g can be used to receive coalescing members 132 and be positioned within riser tube 126. Basket 146g can have substantially the same configuration and be made of the same materials as baskets 146 and 146a-f as discussed above and like reference characters are used to identify like elements. However, in contrast to basket 146, basket 146g has a floor 160 mounted at lower end 153 of sidewall 149 within throughway 155 that supports coalescing members 132 but is liquid permeable so that feed stream 106 can pass therethrough and thus pass through coalescing member 132. As with floor 163, floor 160 can also be formed of wire, mesh, screen, rods, bars, a plate with holes formed therethrough or other structures that will support coalescing members 132 but will allow feed stream 106 to flow therethrough. It will be appreciated that such a screen, wire, mesh, or similar structure may be positioned over the top (e.g., at 143), if desired. Here it is noted that coalescing members 132 are "freely disposed" within basket 146g and that even if a lid was placed on basket 146g so that coalescing members 132 were fully captured within basket 146g, coalescing members 132 would still remain freely disposed therein. The basket 146 could rest on flange 150 (FIG. 4) within riser tube 126, much like any of the other baskets described herein.

FIG. 11 also illustrates a handle 162 that may be attached to floor 160. Handle 162 may provide an easy way for a user to empty basket 146 without having to tip it over, in order to dump out coalescing members 132. For example, floor 160 could be freely positioned within throughway 155 of basket 146 by resting on a flange or other support structure that radially inwardly projects from the interior surface of sidewall 149 at lower end 153. By pulling handle 162, floor 160 could be pulled up relative to sidewall 149, forcing coalescing members 132 to tumble out over the top of sidewall 149 and out of basket 146. Of course, such handle 162 is optional and floor 160 can be rigidly fixed to sidewall 149. In another alternative embodiment, a liquid permeable lid could be positioned over throughway 155 at upper end 151 of basket 146g. The lid would enable feed stream 106 to pass therethrough but would preclude the freely disposed coalescing members 132 from unintentionally coming out of basket 146g.

Figure 12:
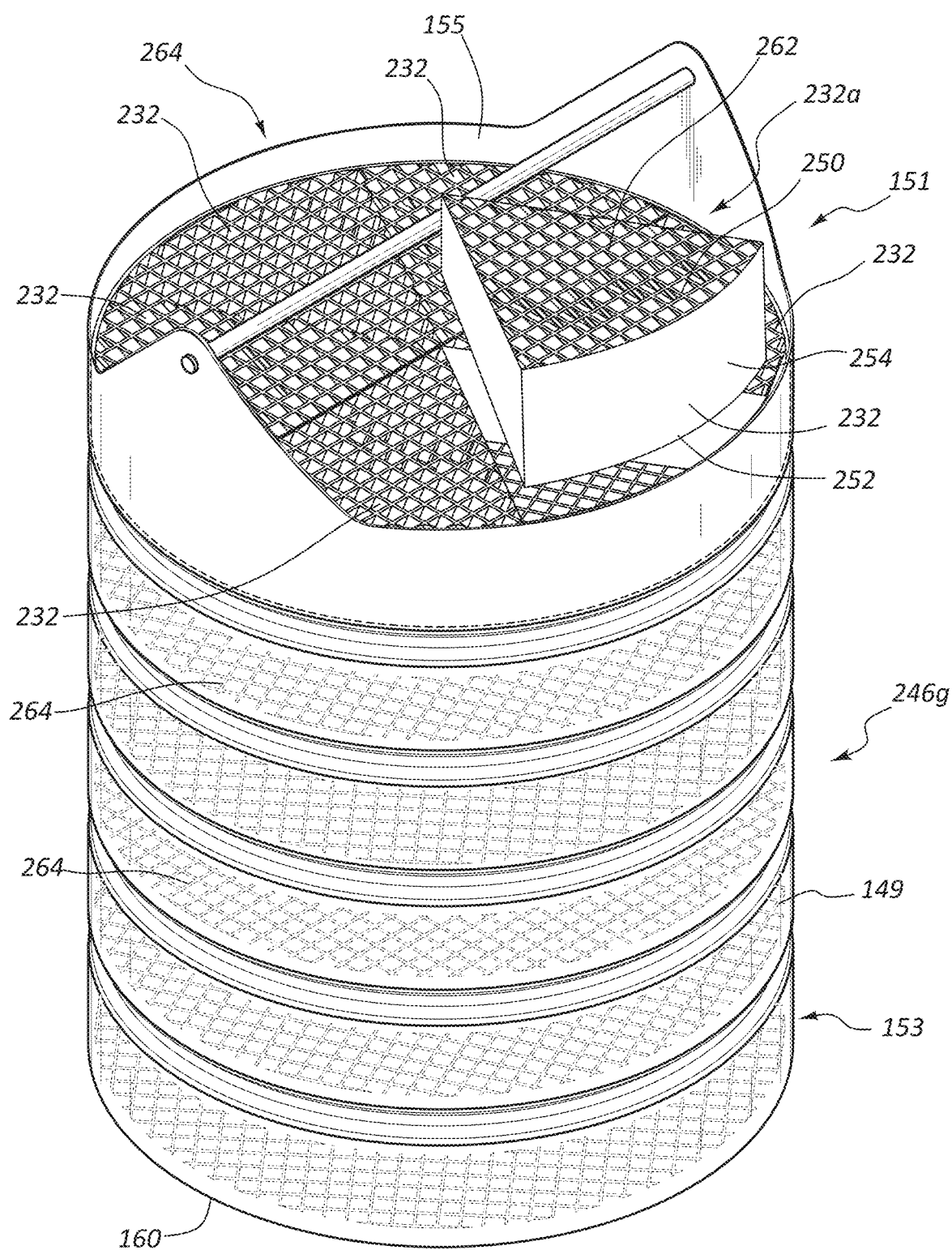
FIG. 12 shows another alternative configuration where the coalescing members may be segments which when placed next to one another form a combined assembly of coalescing member segments disposed within the riser tube.

FIG. 12 shows an alternative embodiment of segmented coalescing structures 232 that can be retained within basket 246g for being supported within riser tube 126. Specifically, in contrast to being spherical, coalescing structures 232 have a top surface 250, an opposing bottom surface 252 and an encircling side surface 254 extending therebetween. Although not required, in the depicted embodiment surfaces 250 and 252 are flat. In other embodiments, surfaces 250 and 252 could be concave, convex, or have irregular or other configurations. Extending between top surface 250 and bottom surface 252 are a plurality of tortuous fluid paths 262. Each fluid path 262 has a tortuosity greater than 1 (e.g., relative to a vertical line) and can be any of the values or within any of the ranges of tortuosity as previously discussed herein. Fluid paths 262 can be formed using slanted channels or other structures that can be used to form tortuous fluid paths.

In the depicted embodiment, each coalescing member segment 232 is wedged shaped and nests between other coalescing members 232 to form a combined coalescing member 264 having a disc shape. Combined coalescing member 264 can be assembled or otherwise positioned within the throughway 155 of basket 246g so as to form one layer of coalescing members. In like manner, multiple combined coalescing members 264 can be stacked within throughway 155 of basket 246g so as to have multiple layers of coalescing members through which feed stream 106 passes as feed stream 106 rises within riser tube 126. The lowest combined coalescing member 264 rests on floor 160 while the above combined coalescing member 264 can rest either directly on top of the lower combined coalescing member 264 or on liquid permeable partitions that can be placed between combined coalescing members 264. This configuration of using combined coalescing members that closely mate together provides systems having fluid paths with high tortuosity and effectively limits or precludes any bypass paths while still providing coalescing members that are easily removed and replaced.

It is again noted that coalescing member segment 232 need not be wedged shaped but could have a variety of other configurations, such as square, L-shaped or other polygonal configurations that fit together to form a combined coalescing member. In yet other embodiments, it is appreciated that combined coalescing member 264 could simply comprise one continuous coalescing member 232 having a disc shape, for stacking one upon another. In other embodiments, it is appreciate that basket 246g can be eliminated and that combined coalescing member 264 can be stacked directly on floor 163 within riser tube 126 (FIG. 4). The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for removing suspended impurities from a liquid, the apparatus comprising:
    a vessel having a chamber for receiving gas induced liquid influent through an inlet, the influent including suspended impurities;
    a riser tube disposed within chamber of the vessel and in fluid communication with the inlet so that the liquid influent introduced into the vessel through the inlet is introduced into the riser tube;
    a plurality of coalescing members within the riser tube, wherein the plurality of coalescing members are rotatable within the riser tube as the liquid influent flows over the coalescing members; and
    a plurality of axles including at least a first axle disposed within the riser tube, the one or more coalescing members being rotatably mounted on the first axle.

2. The apparatus of claim 1, wherein each of the plurality of coalescing members has the configuration of a sphere, cylinder, ovoid, or other rounded shape.

3. The apparatus of claim 1, wherein each of the plurality of coalescing members has the configuration of a sphere.

4. The apparatus of claim 1, further comprising a second axle disposed within the riser tube and having further coalescing members disposed thereon, wherein the second axle is disposed over or under the first axle, and where the second axle is offset laterally or at an angle relative to the first axle.

5. The apparatus of claim 1, wherein each coalescing member has a void volume that is from about 90% to about 97%.

6. The apparatus of claim 1, wherein each coalescing member has an open fraction along an outer boundary that is from about 70% to about 90%.

7. The apparatus of claim 1, wherein each coalescing member has a fluid path extending therethrough having a tortuosity greater than 1.0.

8. The apparatus of claim 1, wherein the plurality of coalescing members comprise at least ten coalescing members.

9. The apparatus of claim 1, further comprising a removable first basket disposed within the riser tube, the plurality of coalescing members being disposed within the first basket so as to allow a user to remove the coalescing members from the riser tube by removing the first basket.

10. The apparatus of claim 9, wherein the removable first basket further comprises one or more handles to aid a user in removing the first basket from the riser tube.

11. The apparatus of claim 9, further comprising a removable second basket disposed above or under the removable first basket, further coalescing members being disposed within the second basket, the first and second baskets being stacked within the riser tube.

12. The apparatus of claim 1, wherein each coalescing member has a maximum diameter of less than about 12 inches (30 cm).

13. The apparatus of claim 1, wherein each coalescing member has a maximum diameter in a range from 2 inches (5 cm) to 6 inches (15 cm).

14. The apparatus of claim 1, wherein the plurality of coalescing members comprise coalescing members having at least two different sizes or shapes.

15. An apparatus for removing suspended impurities from a liquid, the apparatus comprising:
- a vessel having a chamber for receiving gas induced liquid influent through an inlet, the influent including suspended impurities;
- a riser tube disposed within chamber of the vessel and in fluid communication with the inlet so that the liquid influent introduced into the vessel through the inlet is introduced into the riser tube;
- a plurality of coalescing members within the riser tube, wherein the plurality of coalescing members are either freely disposed within the riser tube or are rotatable within the riser tube as the liquid influent flows over the coalescing members; and
- a removable basket disposed within the riser tube, the plurality of coalescing members being disposed within the basket so as to allow a user to remove the coalescing members from the riser tube by removing the first basket.

16. The apparatus of claim 15, wherein the removable basket comprises segments of a combined assembly of individual basket member segments, the combined assembly being formed when a plurality of segments are positioned next to one another, wherein the individual segments are sufficiently small so as to be removable from the combined assembly from the riser tube.

* * * * *